US010960531B2

(12) United States Patent
Knight

(10) Patent No.: US 10,960,531 B2
(45) Date of Patent: Mar. 30, 2021

(54) JOINTED STALL BAR ATTACHMENT

(71) Applicant: CUMMINS INC., Columbus, IN (US)

(72) Inventor: Kendrick H. Knight, Corry, PA (US)

(73) Assignee: Cummins Inc., Columbus, IN (US)

( * ) Notice: Subject to any disclaimer, the term of this patent is extended or adjusted under 35 U.S.C. 154(b) by 238 days.

(21) Appl. No.: 15/529,959

(22) PCT Filed: Sep. 14, 2015

(86) PCT No.: PCT/US2015/050064
§ 371 (c)(1),
(2) Date: May 25, 2017

(87) PCT Pub. No.: WO2016/085557
PCT Pub. Date: Jun. 2, 2016

(65) Prior Publication Data
US 2017/0326722 A1 Nov. 16, 2017

Related U.S. Application Data

(66) Substitute for application No. PCT/US2015/004365, filed on Aug. 7, 2015.
(Continued)

(51) Int. Cl.
*B25H 1/00* (2006.01)
*B25B 23/00* (2006.01)
(Continued)

(52) U.S. Cl.
CPC ........... *B25H 1/0042* (2013.01); *B25B 21/00* (2013.01); *B25B 23/0078* (2013.01); *F16D 7/00* (2013.01);
(Continued)

(58) Field of Classification Search
CPC ... B25H 1/0042; B25B 21/00; B25B 23/0078; B25B 23/00; B25B 23/0021; F16D 7/00;
(Continued)

(56) References Cited

U.S. PATENT DOCUMENTS 5,039,118 A * 8/1991 Huang ...................... B62B 9/20 280/47.371
5,358,352 A 10/1994 Klarhorst
(Continued)

FOREIGN PATENT DOCUMENTS

DE 102009054355 A1 * 4/2011 ........... B25B 21/005
WO WO0134985 A1 5/2001

OTHER PUBLICATIONS

Extended Search Report in corresponding European Application No. 15863943.5, dated Oct. 27, 2017.
(Continued)

*Primary Examiner* — David B. Thomas
*Assistant Examiner* — Aaron R McConnell
(74) *Attorney, Agent, or Firm* — Faegre Drinker Biddle & Reath LLP

(57) ABSTRACT

A torque transfer device is provided to transfer torque from a torque tool to a torque limiter device, the torque transfer device comprising a torque limiter connection member adapted for connection to the torque limiter device; a first joint; a second joint; and a tool connection member adapted for connection to the torque tool, wherein the first joint and the second joint are configured to lock responsive to activation of the torque tool to transfer a reaction torque generated by the torque tool to the torque limiter device, and wherein the first joint and the second joint are configured to unlock responsive to deactivation of the torque tool to
(Continued)

enable rotation between the torque tool and the torque limiter device along a first axis and a second axis different from the first axis.

21 Claims, 23 Drawing Sheets

Related U.S. Application Data

(60) Provisional application No. 62/187,198, filed on Jun. 30, 2015, provisional application No. 62/084,258, filed on Nov. 25, 2014.

(51) Int. Cl.
*B25B 21/00* (2006.01)
*F16D 7/00* (2006.01)
*F16C 19/04* (2006.01)

(52) U.S. Cl.
CPC .......... *F16C 19/04* (2013.01); *F16C 2322/50* (2013.01); *F16C 2361/41* (2013.01)

(58) Field of Classification Search
CPC .......... F16D 3/18; F16D 3/185; F16D 43/202; F16D 43/2022; F16D 43/2026; F16D 48/06; F16D 48/064; F16D 48/08; F16D 1/10; F16D 1/108; F16C 19/04; F16C 2322/50; F16C 2361/41; Y10T 403/32336; Y10T 403/32368; Y10T 403/32409
USPC .......................................... 81/467, 481, 483
See application file for complete search history.

(56) References Cited

U.S. PATENT DOCUMENTS

| | | | | |
|---|---|---|---|---|
| 5,544,554 | A | 8/1996 | Brightly | |
| 5,791,619 | A | 8/1998 | Myers | |
| 6,742,954 | B2 | 6/2004 | Jouko | |
| 6,848,344 | B2 | 2/2005 | Rocco | |
| 8,016,510 | B2 | 9/2011 | Schwyn et al. | |
| 8,898,862 | B1 * | 12/2014 | McGrath | E05D 11/1007<br>16/326 |
| 9,265,551 | B2 * | 2/2016 | Kust | B25B 23/14 |
| 2003/0136229 | A1 | 7/2003 | Junkers | |
| 2003/0143042 | A1 * | 7/2003 | Doyle | B25B 23/141<br>408/124 |
| 2006/0056908 | A1 | 3/2006 | Schwyn et al. | |
| 2010/0269645 | A1 * | 10/2010 | Bonas | B25B 21/002<br>81/462 |
| 2011/0197719 | A1 | 8/2011 | Neitzell et al. | |
| 2013/0161041 | A1 | 6/2013 | Junkers et al. | |
| 2016/0229037 | A1 * | 8/2016 | Quigley | G01L 5/24 |

OTHER PUBLICATIONS

International Search Report and Written Opinion issued by the ISA/US, Commissioner for Patents, dated Nov. 9, 2015, for International Application No. PCT/US2015/044365; 6 pages.
International Preliminary Report on Patentability issued by the ISA/US, Commissioner for Patents, dated Oct. 9, 2015, for International Application No. PCT/US2015/044365; 5 pages.
International Preliminary Report on Patentability issued by The International Bureau of WIPO, dated May 30, 2017, for International Application No. PCT/US2015/050064; 5 pages.
International Search Report and Written Opinion dated Dec. 28, 2015 in PCT/US2015/050064.

* cited by examiner

JOINTED STALL BAR ATTACHMENT

CROSS-REFERENCE TO RELATED APPLICATIONS

The present application is a National Stage of International Application No. PCT/US2015/050064, which claims priority from International Patent Application No. PCT/2015/044365, filed on Aug. 7, 2015, and the benefit of U.S. Provisional Patent Application No. 62/084,258, filed on Nov. 25, 2014, and of U.S. Provisional Patent Application No. 62/187,198, filed on Jun. 30, 2015, said applications entitled “JOINTED STALL BAR ATTACHMENT” and incorporated by reference herein in their entirety.

TECHNICAL FIELD

The present invention relates to reaction torque management and more particularly to adapters for torque tools to couple the tools to a torque limiter device to absorb reaction torque.

BACKGROUND OF THE DISCLOSURE

In the production of many products, such as engines, assembly lines are used to connect components to one another. The tools for connecting these components are typically pneumatic or electric power tools that permit workers to torque nuts and bolts to the desired torque requirements. One problem with the mass production of such products is that workers may be subjected to reaction torque when the nuts and/or bolts are tightened to the desired torque. In other words, in high torque applications, workers may experience high reaction torque loads on their arms, etc. when the desired torque is applied.

Generally, the reaction torque of the powered tool (which is equal but opposite to the torque applied to the fastener), if not absorbed by the tool operator is transferred to a reaction bar or stall bar. Such stall bars are typically rigidly attached to the torque tool and oriented in a fashion to absorb reaction torque in one direction. Consequently, multiple torque tools must be used with stall bars for torqueing fasteners in multiple orientations. This of course adds costs and inefficiency to the production line.

Consequentially, it is desirable to provide a method and apparatus for use with a torque tool on an assembly line or otherwise to use the torque tool in multiple orientations while still permitting a stall bar to absorb the reaction torque of the torque tool when the fastener is fully torqued.

SUMMARY OF DISCLOSED EMBODIMENTS

Embodiments of torque transfer devices and a method of torqueing a securement device using a torque transfer device are disclosed. Generally, torque transfer devices according with the disclosure comprise two joints that lock upon activation of a torque tool to prevent rotation of the torque tool about a torque limiter device, and unlock upon disengagement of the torque tool to permit rotation of the torque tool about two axis of rotation about the torque limiter device. Locking the joints transfers a reaction torque generated by the torque tool to the torque limiter device and enables engagement of the torque tool with a securement device oriented at one of multiple angles relative to the torque limiter device, thereby eliminating the need for multiple torque transfer devices having only one axis of rotation.

In one embodiment of a torque transfer device to transfer torque from a torque tool to a torque limiter device according with the present disclosure, the torque transfer device comprises a torque limiter connection member adapted for connection to the torque limiter device; a first joint; a second joint; and a tool connection member adapted for connection to the torque tool. The first joint and the second joint are configured to lock responsive to activation of the torque tool to transfer a reaction torque generated by the torque tool to the torque limiter device. The first joint and the second joint are also configured to unlock responsive to deactivation of the torque tool to enable rotation between the torque tool and the torque limiter device along a first axis and a second axis different from the first axis.

In another embodiment of a torque transfer device to transfer torque from a torque tool to a torque limiter device according with the present disclosure, the torque transfer device comprises a torque limiter connection member adapted for connection to the torque limiter device; a tool connection member adapted for connection to the torque tool; first joint means for rotatably joining the torque limiter connection member to the tool connection member to permit the torque tool to rotate about a first axis relative to the torque limiter device when the torque tool is not activated and to prevent rotation of the torque tool about the first axis when the torque tool is activated; and second joint means for rotatably joining the first joint means to the tool connection member to permit the torque tool to rotate about a second axis relative to the torque limiter device when the torque tool is not activated and to prevent rotation of the torque tool about the second axis when the torque tool is activated.

In one embodiment of a method of torqueing a securement member with a torque tool according with the present disclosure, the method comprises connecting a torque transfer device to the torque tool; connecting the torque transfer device to a torque limiter device; and activating the torque tool. The torque transfer device comprises a first joint configured to permit the torque tool to rotate about a first axis relative to the torque limiter device and a second joint configured to permit the torque tool to rotate about a second axis relative to the torque limiter device. Activation of the torque tool locks the first joint and the second joint to prevent rotation of the torque tool about the first axis and the second axis and after deactivation of the torque tool the first joint and the second joint are deactivated to enable rotation of the torque tool about the first axis and the second axis.

According to another embodiment of the present disclosure, an adapter is provided comprising a torque limiter device projection for connection to a torque limiter device, a tool holder for connection to a torque tool; and a pair of brackets including an upper bracket including the torque limiter device projection and a first joint assembly coupled to the tool holder, the pair of brackets further including a first joint configured to permit the torque tool to rotate about a first axis relative to the torque limiter device when the torque tool is not activated and to prevent rotation of the torque tool about the first axis when the torque tool is activated, and a second joint configured to permit the torque tool to rotate about a second axis relative to the torque limiter device when the torque tool is not activated and to prevent rotation of the torque tool about the second axis when the torque tool is activated. According to one aspect of the present disclosure, the first joint includes a first gear that is movable from a first position wherein the first gear engages at least one first reaction gear of the first joint when the torque tool is activated to prevent rotation of the torque tool about the first axis and a second position wherein the first gear disengages from the at least one first reaction gear when the torque tool is not activated. According to a variant of this aspect, the second joint includes a second gear that is movable from a first position wherein the second gear engages at least one second reaction gear of the second joint when the torque tool is activated to prevent rotation of the torque tool about the second axis and a second position wherein the second gear disengages from the at least one second reaction gear when the torque tool is not activated. According to another aspect, the first joint further includes a first actuator that responds to actuation of the torque tool to move the first gear to the first position and the second joint includes a second actuator that responds to actuation of the torque tool to move the second gear to the first position.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

The embodiments described below are merely exemplary and are not intended to limit the invention to the precise forms disclosed. Instead, the embodiments were selected for description to enable one of ordinary skill in the art to practice the invention.

Figure 1A:
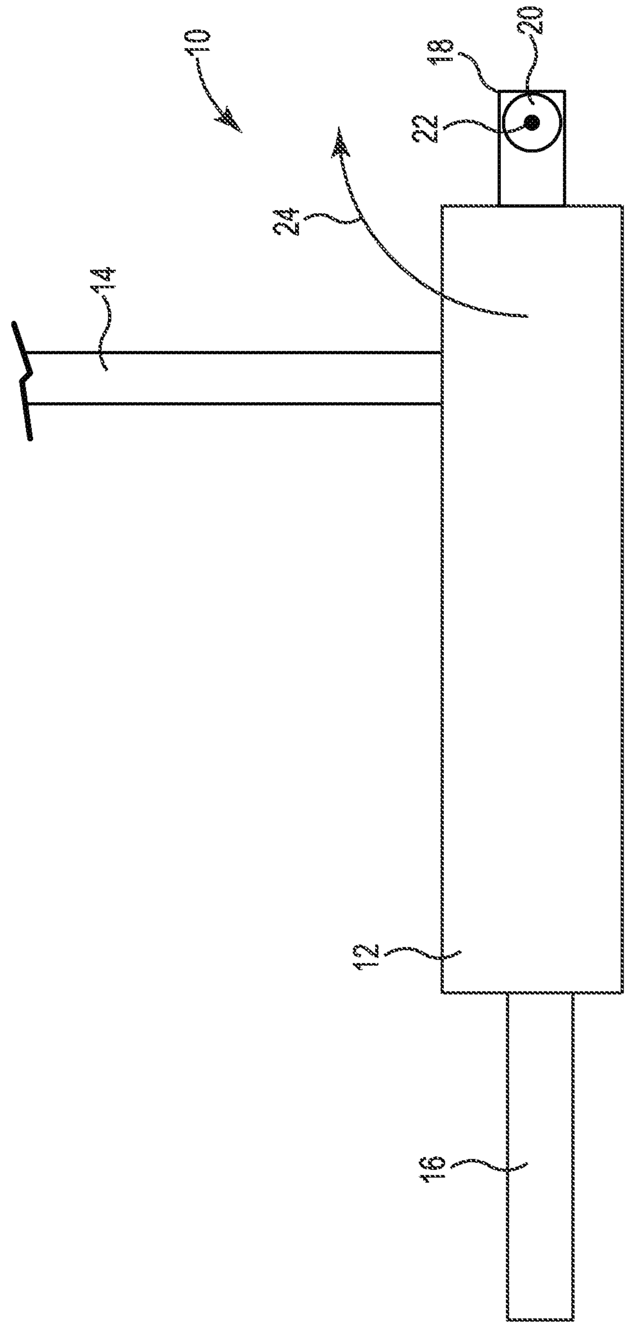
FIG. 1A is a side view of a prior art torque tool configuration.
Figure 1B:
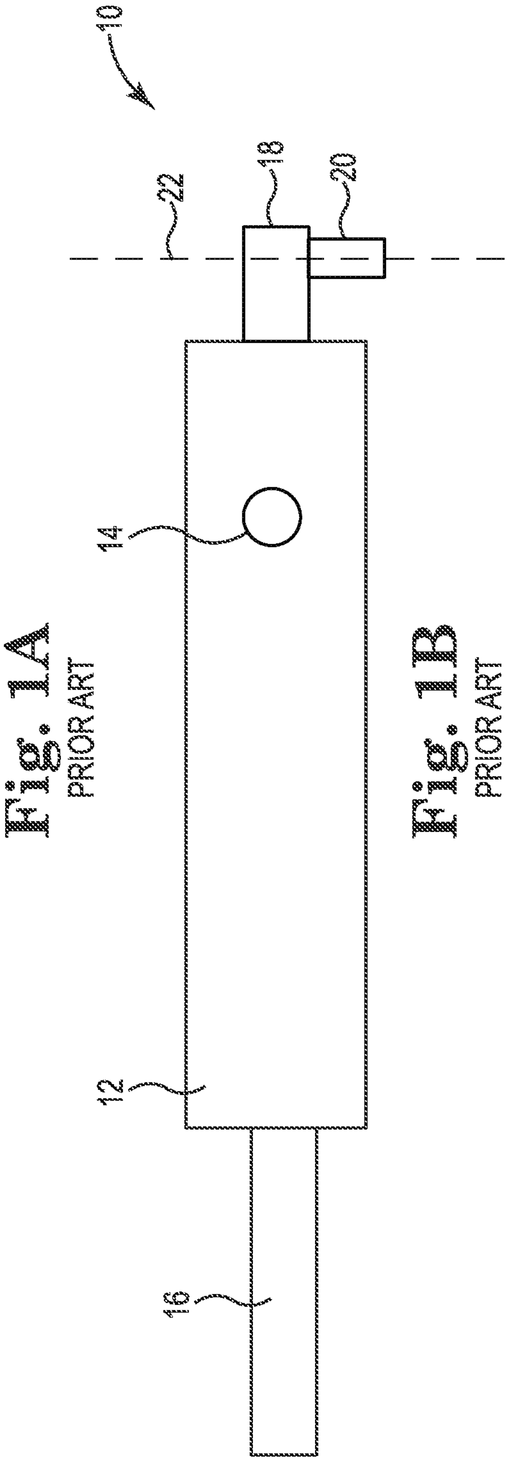
FIG. 1B is a top view of the prior art torque tool configuration of FIG. 1A.

Referring now to FIGS. 1A and 1B, a prior art torque tool configuration 10 is shown. In configuration 10, a torque tool 12 is rigidly coupled to a torque limiter device 14. Torque tool 12 in this example includes a handle 16 and a drive body 18 with a socket attachment 20 that rotates about axis 22 as shown in FIG. 1B. In use, an operator moves tool 12 such that socket attachment 20 is in alignment with a fastener to be torqued. The operator activates tool 12 and socket attachment rotates about axis 22. When the fastener is fully torqued, a reaction torque (represented by arrow 24) in a direction opposite to the direction of rotation of socket attachment 20 is absorbed by torque limiter device 14, e.g. a stall bar.

While configuration 10 addresses the need to reduce the transfer of reaction torque to operators, configuration 10 is only suitable for use in torqueing fasteners having rotation axes that are parallel to axis 22. When assembling many products such as engines, fasteners having many different orientations are typically used. As such, a configuration 10 must be provided for each orientation, and many configurations 10 may be required to complete assembly of the product.

Figure 2:
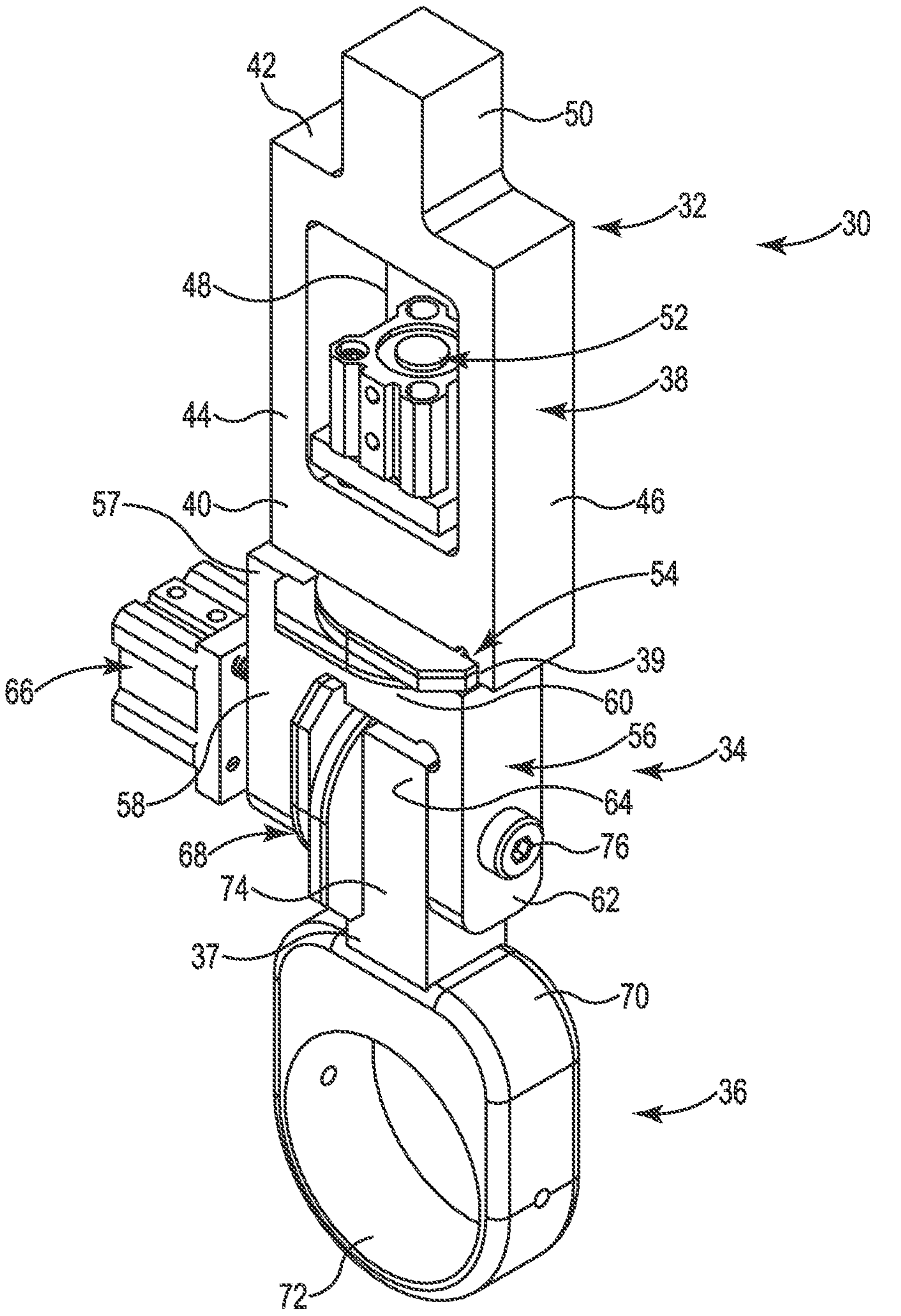
FIG. 2 is a perspective view of a torque transfer device according to the teachings of the present disclosure.
Figure 20:
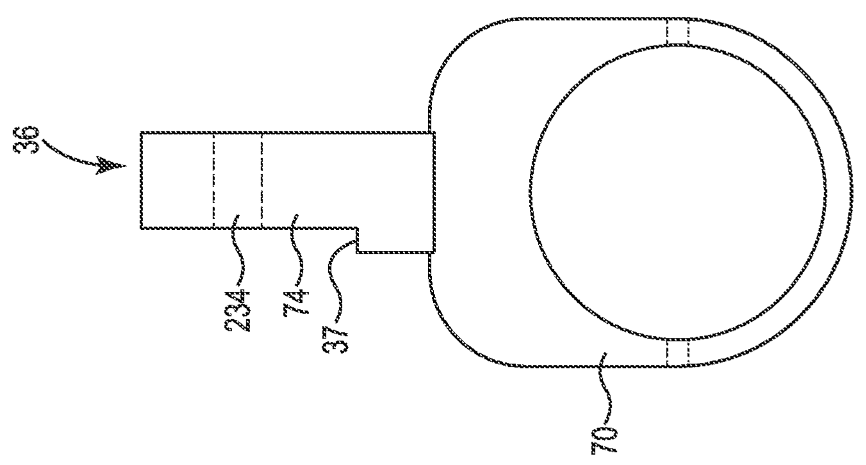
FIGS. 19 and 20 are views of a tool holder of the torque transfer device of FIG. 2.
Figure 19:
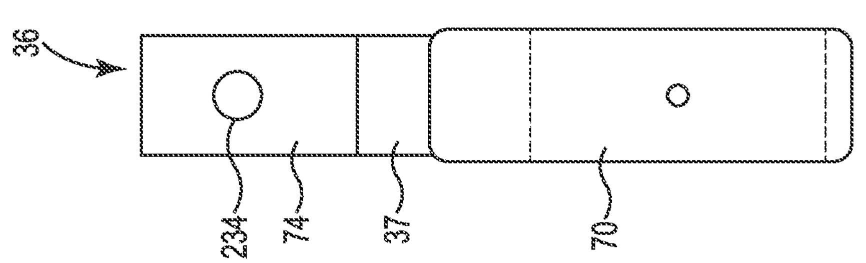

Referring now to FIG. 2, a torque transfer device 30 according to the present disclosure is shown. Torque transfer device 30 generally includes a torque limiter connection member 50, a first joint assembly 32, a second joint assembly 34, and a tool holder 36 (best seen in FIGS. 19 and 20). Tool holder 36 supports a torque tool. First joint assembly 32 and second joint assembly 34 are activated responsive to activation of the torque tool. Upon activation of the torque tool, first joint assembly 32 and second joint assembly 34 lock, thereby the reaction torque of the torque tool transfers therethrough to torque limiter connection member 50 and a torque limiter device connected to it. When the torque tool is deactivated, first joint assembly 32 and second joint assembly 34 become unlocked, and the torque tool can be reoriented with at least two degrees of freedom relative to the torque limiter device. Additional degrees of freedom may be provided by use of suitable tool holders and torque limiter connection members.

In one embodiment of a method of torqueing a securement member with a torque tool, the method comprises connecting a torque transfer device to the torque tool; connecting the torque transfer device to a torque limiter device; and activating the torque tool. The securement member may be a fastener. Exemplary fasteners include bolts, nuts, and screws. The torque transfer device comprises a first joint configured to permit the torque tool to rotate about a first axis relative to the torque limiter device and a second joint configured to permit the torque tool to rotate about a second axis relative to the torque limiter device. Activation of the torque tool locks the first joint and the second joint to prevent rotation of the torque tool about the first axis and the second axis and after deactivation of the torque tool the first joint and the second joint are unlocked to enable rotation of the torque tool about the first axis and the second axis. Exemplary torque transfer devices include torque transfer device 30 and torque transfer device 300, described below with reference to FIGS. 23 and 24.

Figure 8:
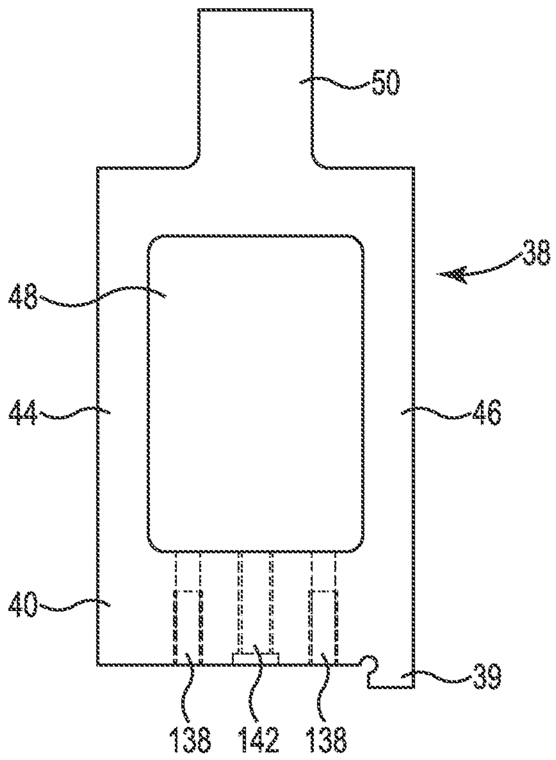
FIGS. 8 and 9 are side and bottom views of the body of an upper frame of the torque transfer device of FIG. 2.
Figure 9:
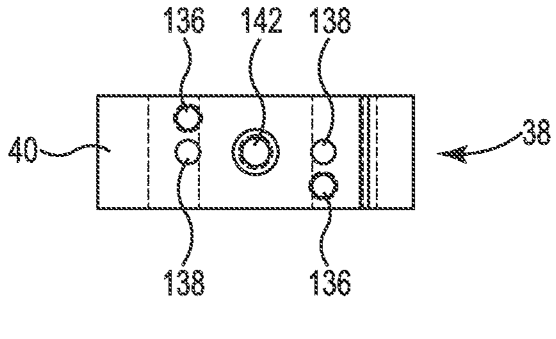

Returning to FIG. 2, first joint assembly 32 includes a frame 38 (best seen in FIGS. 8 and 9) having a lower wall 40, an upper wall 42, and a pair of side walls 44, 46 extending between lower wall 40 and upper wall 42. Together lower wall 40, upper wall 42, and side walls 44, 46 form a central opening 48. Torque limiter connection member 50 extends from upper wall 42 and is sized to be coupled to the torque limiter device. First joint assembly 32 also includes a first joint 54 and a rod actuator 52 positioned within central opening 48 and operable to lock the first joint 54 as is further described below.

Figure 12:
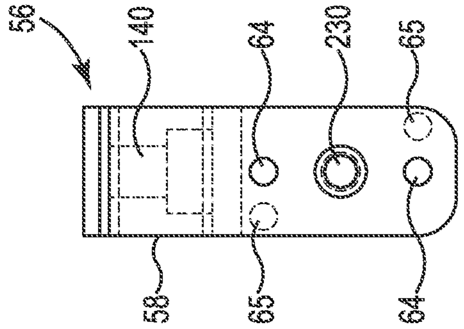
FIGS. 10 to 12 are views of the body of a lower frame of the torque transfer device of FIG. 2.
Figure 11:
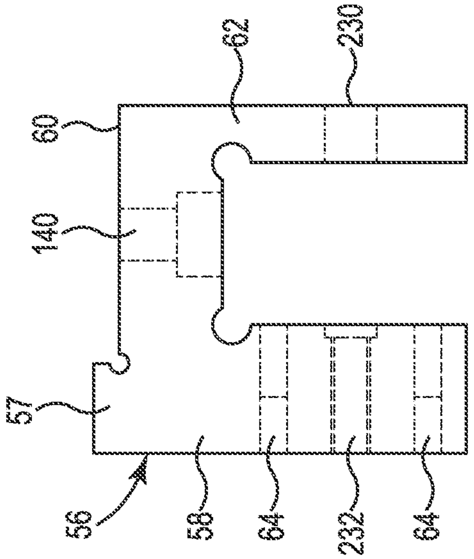
Figure 10:
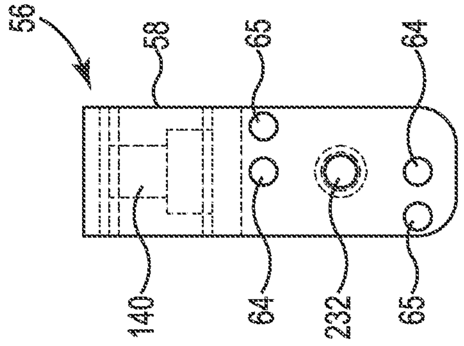
Figure 13:
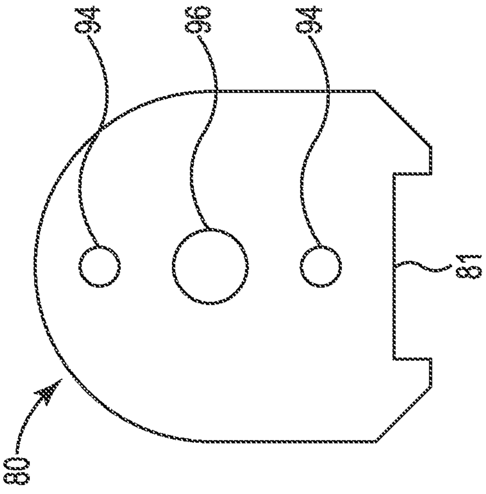
FIGS. 13 to 16 are views of various components of the first joint of the torque transfer device of FIG. 2.
Figure 14:
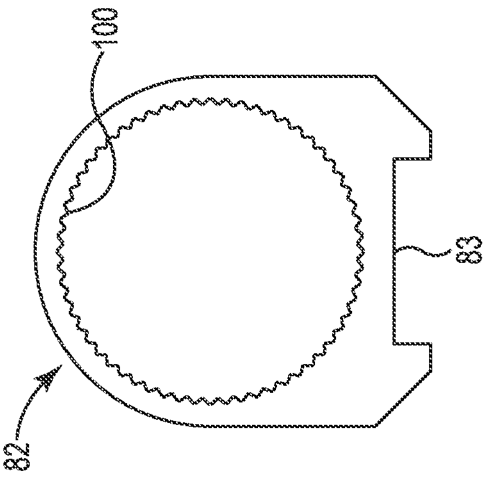
Figure 15:
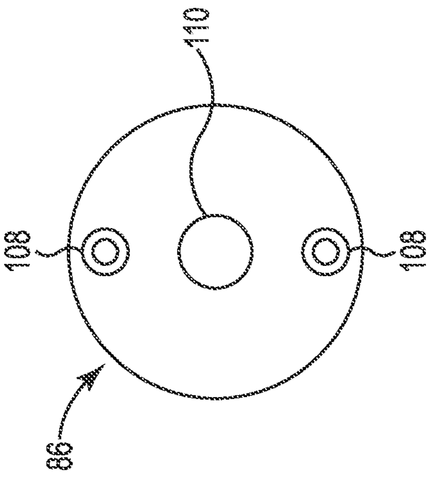
Figure 16:
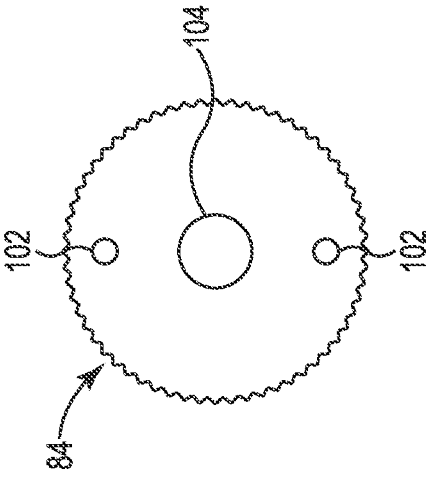

Second joint assembly 34 of torque transfer device 30 generally includes a frame 56 (best seen in FIGS. 10-12) having a base 58, an upper wall 60 extending from base 58, and an end wall 62 extending from upper wall 60. As shown, end wall 62 extends in substantially parallel relationship to base 58 and together base 58, upper wall 60, and end wall 62 form a gap 64. Second joint assembly 34 also includes a second joint 68 and a rod actuator 66 mounted to base 58 and operable to lock second joint 68 as is further described below.

Tool holder 36 generally includes a tool adapter 70 defining an opening 72 for receiving the torque tool and a tool connection member 74 that extends into gap 64 and is coupled to second joint assembly 34 by shoulder bolt 76. As described with reference to FIGS. 23 and 24, tool adapter 70 may comprise a rotatable coupling to provide a third degree of rotatable freedom.

Figure 3:
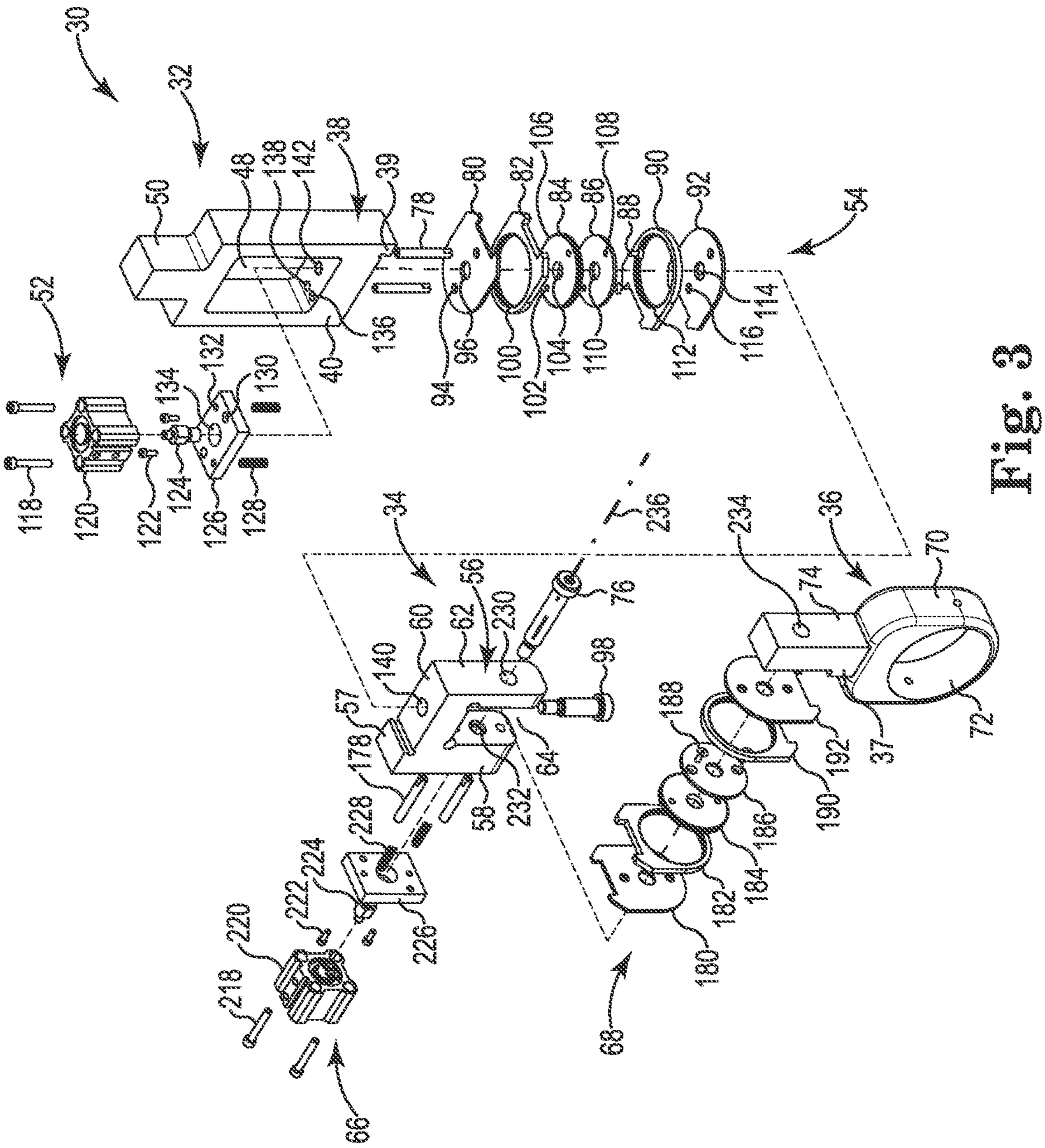
FIG. 3 is an exploded, perspective view of the torque transfer device of FIG. 2.
Figure 4:
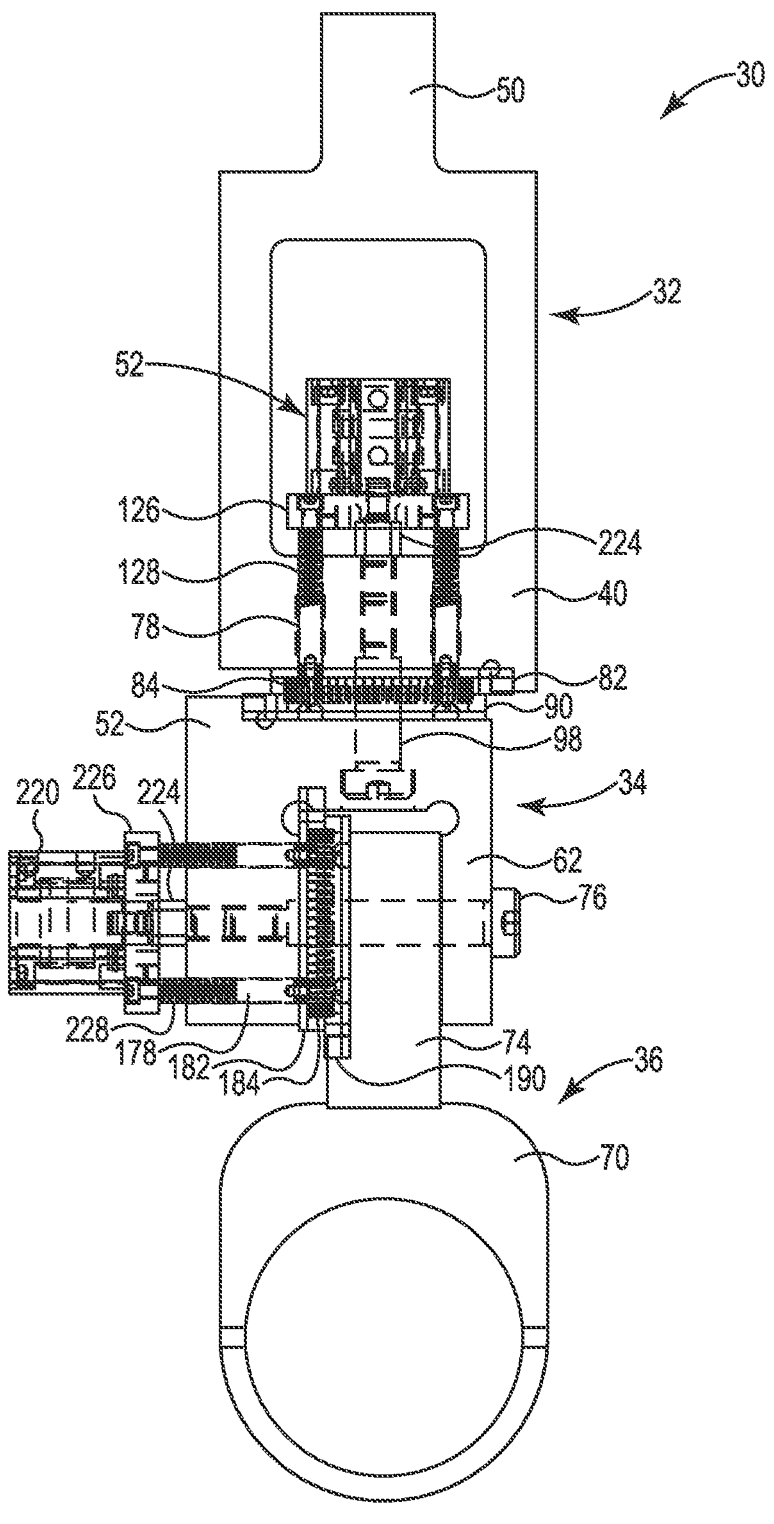
FIGS. 4 and 5 are side partially sectioned views of the torque transfer device of FIG. 2.
Figure 5:
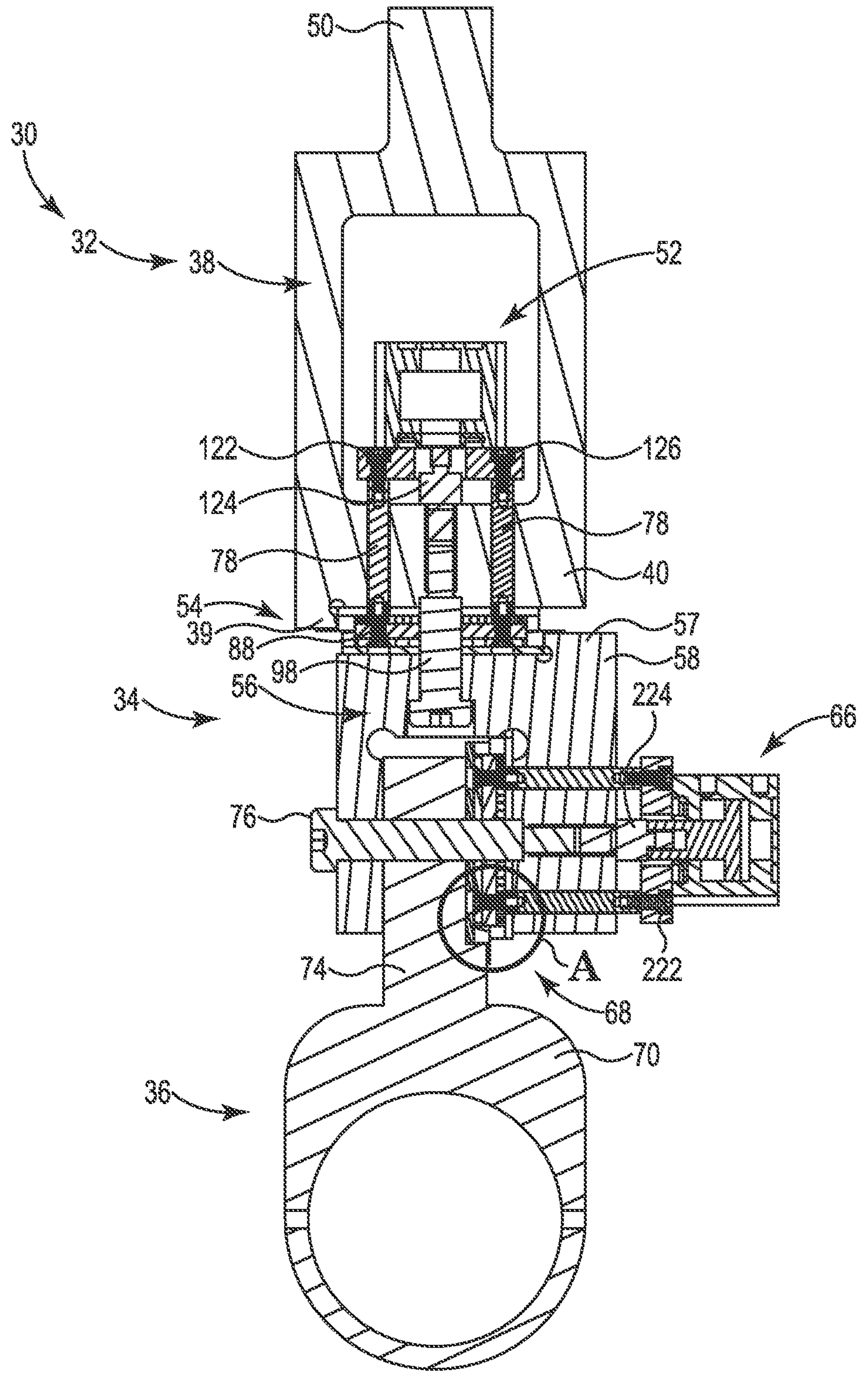
Figure 6:
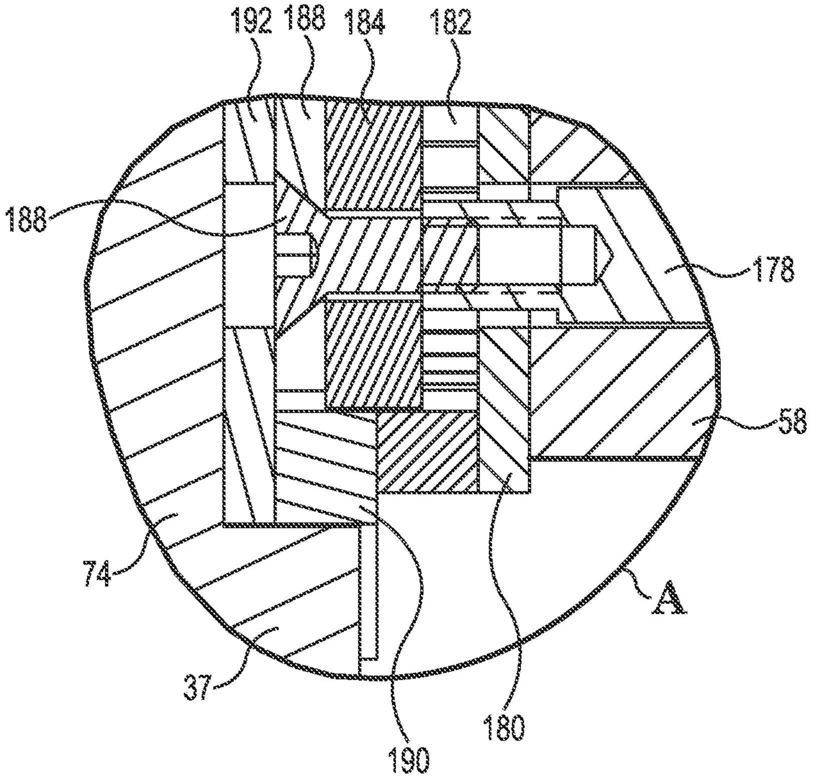
FIG. 6 is an expanded view of a section of the torque transfer device of FIG. 2 as shown in FIG. 5.
Figure 22:
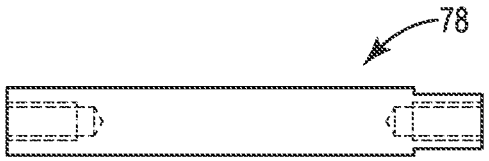
FIG. 22 is a view of a gear rod of the torque transfer device of FIG. 2.

As shown in FIG. 3, first joint 54 generally includes gear rods 78 (best shown in FIG. 22), an upper cover plate 80, an upper outer gear 82, an inner gear 84, a spacer 86, fasteners 88, a lower outer gear 90, and a lower cover plate 92. Upper cover plate 80, upper outer gear 82, spacer 86 and inner gear 84 are best seen in FIGS. 13-16, respectively. Inner gear 84 and lower outer gear 90 may be referred to as first gear and first reaction gear. As described below, the first gear is movable from a first position to a second position. In the first position the first gear is disengaged from the first reaction gear. In the second position, the first gear engages the first reaction gear to lock first joint 54. The first and second positions are described in detail with reference to FIGS. 7A and 7B. Upper cover plate 80 includes a pair of openings 94 for receiving gear rods 78 and a central opening 96 for receiving shoulder bolt 98. Upper outer gear 82 includes a plurality of teeth 100 for meshing with inner gear 84. Inner gear 84 includes a pair of openings 102, a central opening 104 for receiving shoulder bolt 98, and a plurality of peripheral teeth 106 for meshing with teeth 100 of outer gears 82, 90 as described in more detail below. Spacer 86 includes a pair of openings 108 and a central opening 110 for receiving shoulder bolt 98. Lower outer gear 90 includes a plurality of teeth 112 for meshing with inner gear teeth 106 in the manner described below. Finally, lower cover plate 92 includes a central opening 114 for receiving shoulder bolt 98 and a pair of openings 116 to allow interchangeability with cover plates 80, 180 and 192.

Figure 17:
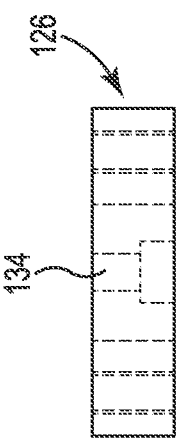
FIGS. 17 and 18 are views of a cylinder plate of the torque transfer device of FIG. 2.
Figure 18:
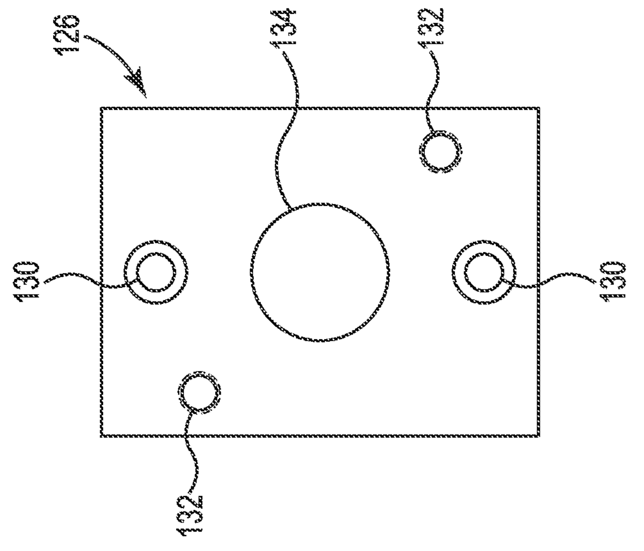
Figure 21:
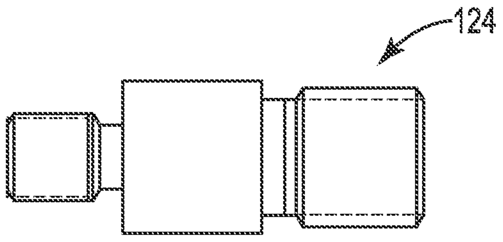
FIG. 21 is a view of a rod adapter of the torque transfer device of FIG. 2.

Rod actuator 52 includes housing fasteners 118, a rod housing 120, gear rod fasteners 122, a rod adapter 124 (best shown in FIG. 21), a cylinder plate 126 and springs 128. Cylinder plate 126 (best shown in FIGS. 17 and 18) includes openings 130 for receiving gear rod fasteners 122 to secure gear rods 78 to cylinder plate 126, threaded openings 132 for receiving housing fasteners 118 to secure rod housing 120 to cylinder plate 126, and a central opening 134 for receiving rod adapter 124 in the manner described below.

Rod actuator 52 and first joint 54 are assembled and operate in the following fashion. Springs 128 are placed into recesses 136 formed into lower wall 40 of first joint assembly 32. Gear rod fasteners 122 are placed through openings 130 of cylinder plate 126 and into the ends of gear rods 78, thereby securing gear rods 78 to cylinder plate 126. The assembly of cylinder plate 126 and gear rods 78 is placed into central opening 48 of first joint assembly 32 and gear rods 78 are placed through openings 138 formed in lower wall 40 of first joint assembly 32. Gear rods 78 are placed through openings 94 of upper cover plate 80 and upper cover plate 80 is positioned against a lower surface of lower wall 40 such that a notch 81 in upper cover plate 80 (shown in FIG. 13) engages an extension 39 of lower wall 40 (shown in FIG. 8), thereby fixing the position of upper cover plate 80. Upper outer gear 82 is placed below upper cover plate 80 and gear rods 78 are positioned on openings 102 of inner gear 84. A notch 83 in upper outer gear 82 (shown in FIG. 14) also engages extension 39 of lower wall 40 to fix the position of upper outer gear 82 relative to frame 38. Spacer 86 is placed below inner gear 84 and fasteners 88 are threaded through openings 108 of spacer 86 and openings 102 of inner gear 84 and into threaded openings on the ends of gear rods 78. This secures gear rods 78 to inner gear 84 (and spacer 86). Lower outer gear 90 is placed below spacer 86 and lower cover plate 92 is placed below lower outer gear 90. Second joint assembly 34 is placed below lower cover plate 92 such that an extension 57 of upper wall 60 of second joint assembly 34 (shown in FIG. 11) engages notches formed in lower outer gear 90 and lower cover plate 92, thereby fixing lower outer gear 90 and lower cover plate 92 in position relative to second joint assembly 34. Shoulder bolt 98 is then placed through opening 140 of upper wall 60 of second joint assembly 34 and through the central openings of components 92, 90, 86, 84, 82 and 80. The end of shoulder bolt 98 is threaded into and secured within an opening (not shown in FIG. 3, but disposed directly below opening 142) formed in the lower surface of lower wall 40 of first joint assembly 32. In this manner, first joint assembly 32 is connected to second joint assembly 34 with the components of first joint 54 sandwiched therebetween. Rod adapter 124 is then placed through opening 134 of cylinder plate 126 and threaded into and secured within opening 142 formed in lower wall 40 of first joint assembly 32. The rod of rod housing 120 is extended from and connected to rod adapter 124. Rod housing 120 is then secured to cylinder plate 126 using cylinder fasteners 118.

Figure 7B:
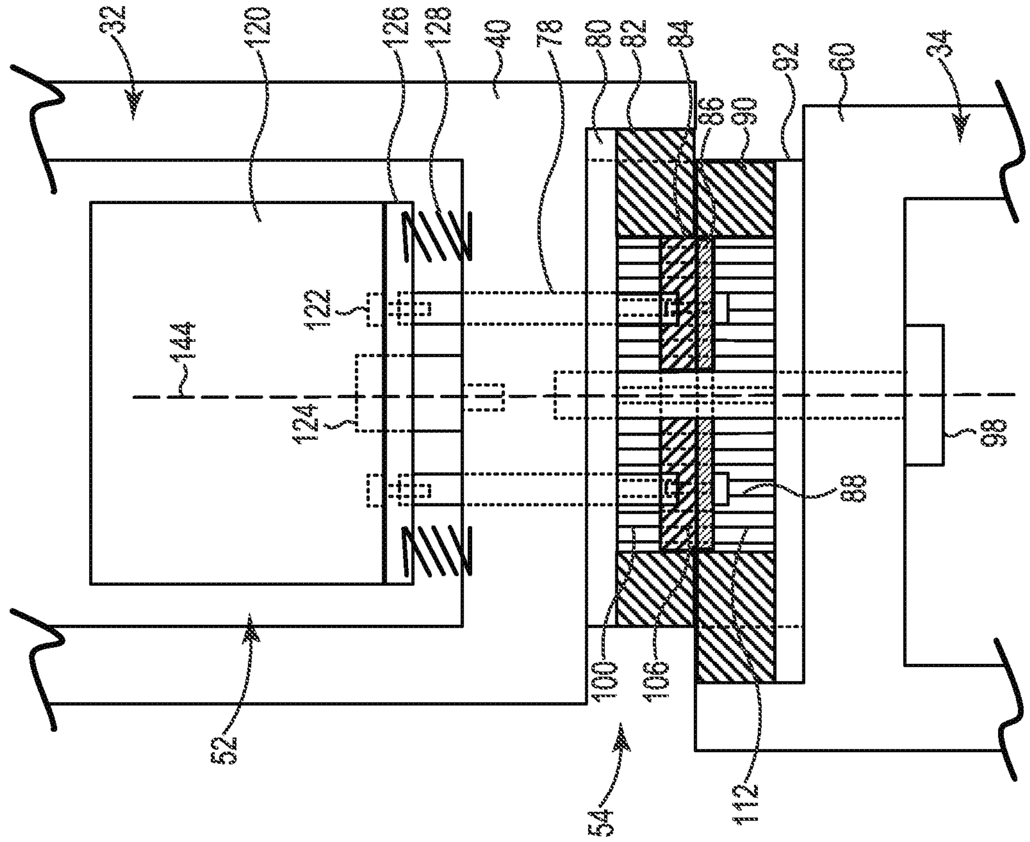
FIGS. 7A and 7B are side, partially sectioned views of a first joint of the torque transfer device of FIG. 2 in a locked and unlocked position, respectively.
Figure 7A:
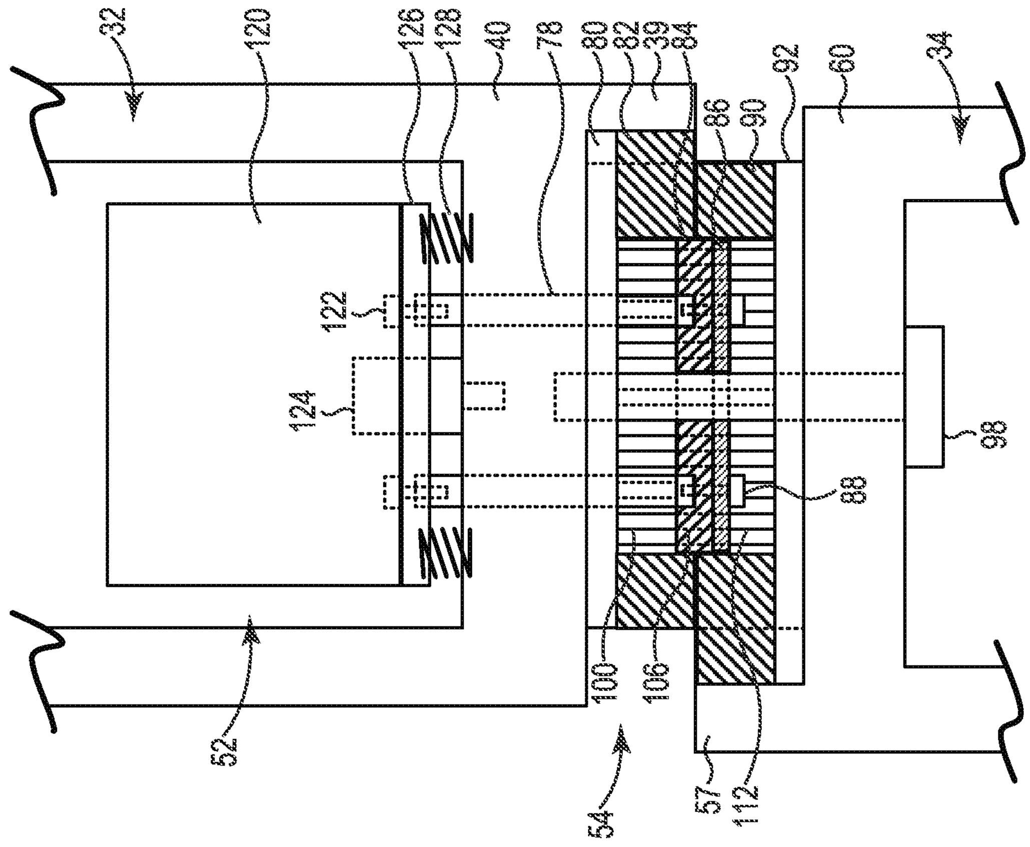

First joint assembly 32 is normally unlocked. Energy is required to compress springs 128 to cause inner gear 84 to move downwardly and partially within upper outer gear 82 and lower outer gear 90 to lock first joint assembly 32. Correspondingly, when energy is unavailable, first joint assembly 32 unlocks. As best shown in FIGS. 7A and 7B, as assembled rod housing 120 and cylinder plate 126 are attached (via gear rod fasteners 122) to one end of gear rods 78 above lower wall 40 of first joint assembly 32. Additionally, inner gear 84 and spacer 86 are attached to the other end of gear rods 78 (via fasteners 88). As shown in FIG. 7A, when rod actuator 52 is activated, rod adapter 124 is retracted. As rod adapter 124 is fixedly connected to lower wall 40, this retraction causes rod housing 120 and cylinder plate 126 to move downwardly toward lower wall 40 against the upward force of springs 128. Consequently, gear rods 78 also move downwardly, thereby moving inner gear 84 from a first position downwardly to a second position thereby placing first joint 54 in a locked position. When first joint 54 is in the locked position, inner gear 84 is partially within upper outer gear 82 and partially within lower outer gear 90. Additionally, teeth 106 of inner gear 84 engage teeth 100 of upper outer gear 82 and teeth 112 of lower outer gear 90. In one embodiment of the present disclosure, spacer 86 bottoms out against cover plate 92 thereby controlling the insertion depth of inner gear 84 into lower outer gear 90. In either embodiment, this prevents rotation of first joint 54. In other words, second joint assembly 34 cannot be rotated about shoulder bolt 98 relative to first joint assembly 32 because the meshing of teeth between inner gear 84 and outer gears 82, 90 prevents rotation of the outer gears 82, 90 (and therefore first joint assembly 32 and second joint assembly 34) relative to one another. Rod actuator 52 is activated automatically upon detection by a control device (not shown) of actuation of torque tool 12.

As shown in FIG. 7B, when rod actuator 52 is not activated (because torque tool 12 is not activated) rod adapter 124 is allowed to extend. Springs 128 therefore expand to their normally expanded state and cause rod housing 120 and cylinder plate 126 to move upwardly away from lower wall 40. Consequently, gear rods 78 also move upwardly, thereby moving inner gear 84 from the second position upwardly to the first position thereby placing first joint 54 in an unlocked position. When first joint 54 is in the unlocked position, inner gear 84 is positioned entirely within upper outer gear 82. Spacer 86 remains in lower outer gear 90 to maintain alignment of lower outer gear 90 as first joint 54 is rotated about axis 144. Additionally, teeth 106 of inner gear 84 engage teeth 100 of upper outer gear 82, but teeth 106 do not engage teeth 112 of lower outer gear 90. This permits rotation of first joint 54. In other words, second joint assembly 34 can be rotated about shoulder bolt 98 relative to first joint assembly 32 because nothing prevents rotation the outer gears 82, 90 (and therefore first joint assembly 32 and second joint assembly 34) relative to one another. This permits the operator to position second joint assembly 34 and torque tool 12 in any orientation about an axis 144 through shoulder bolt 98. Rod actuator 52 is deactivated automatically upon detection by a processing device, controller, or other control device (not shown) that torque tool 12 is no longer activated.

Referring back to FIG. 3, second joint 68 and rod actuator 66 are shown. Second joint 68 includes the same components as those of first joint 54, which are numbered with the numbers of the corresponding components of first joint 54, increased by 100. Therefore, the components of second joint 68 include gear rods 178, an upper cover plate 180, an upper outer gear 182, an inner gear 184, a spacer 186, fasteners 188, a lower outer gear 190, and a lower cover plate 192. The components of rod actuator 66 are the same as those of rod actuator 52, which are numbered with the numbers of the corresponding components of rod actuator 52, increased by 100. Therefore, the components of rod actuator 66 include housing fasteners 218, a rod housing 220, gear rod fasteners 222, a rod adapter 224, a cylinder plate 226 and springs 228. Inner gear 184 and lower outer gear 190 may be referred to as second gear and second reaction gear. The second gear is movable from a first position to a second position. In the first position the second gear is disengaged from the second reaction gear. In the second position, the second gear engages the second reaction gear to lock second joint 68.

The assembly and operation of second joint 68 and rod actuator 66 are also very similar to the assembly and operation of first joint 54 and rod actuator 52 described above. In general, plate 226 is attached to one end of gear rods 178 using gear rod fasteners 222. The other end of gear rods 178 is attached to inner gear 184 and spacer 186 using fasteners 188. Springs 228 are positioned between plate 226 and wall 58 of second joint assembly 34. Rod housing 220 is attached to plate 226 using housing fasteners 218. For second joint 68, shoulder bolt 76 is placed through an opening 230 of wall 62 of second joint assembly 34, through an opening 234 of tool connection member 74 of tool holder 36, through the components of second joint 68, and threaded into and secured to an opening 232 of wall 58 of second joint assembly 34. Notches in lower cover plate 192 and lower outer gear 190 engage an extension 37 of tool holder 36 (best seen in FIGS. 19 and 20) to prevent relative rotation between them.

As described above with reference to first joint 54 and rod actuator 52, inner gear 184 of second joint 68 is moved by the activation and deactivation of rod actuator 66 (and the biasing force of springs 228) to place second joint 68 in either a locked or an unlocked position. When in the locked position, rod adapter 224 is retracted to position inner gear 184 into meshing engagement with upper and lower outer gears 182, 190, thereby preventing rotation of second joint 68. When in the unlocked position, rod adapter 224 is extended (by the biasing force of springs 228) to position inner gear 184 into meshing engagement with upper outer gear 182 but out of meshing engagement with lower outer gear 190, thereby permitting rotation of second joint 68 (and in particular tool holder 36 and torque tool 12) about an axis 236 of second joint 68 which is perpendicular to axis 144 through shoulder bolt 76 (see FIG. 7B) of first joint 54. As second joint 68 (and tool holder 36 and torque tool 12) are prevented from rotating about axis 236 when second joint 68 is locked, torque limiter device 30 absorbs any reaction torque of tool 12 about axis 236. As second joint 68 permits rotation of tool holder 36 and torque tool 12 about axis 236 when unlocked, torque limiter device 30 permits reorientation of tool 12 into any orientation about axis 236.

In the manner described above, first joint 54 and second joint 68 absorb reaction torque from tool 12 when in the locked position (transferring such reaction torque to torque limiter device 14 through torque limiter connection member 50), which corresponds to activation of torque tool 12. Additionally, first joint 54 and second joint 68 permit reorientation of tool 12 into any orientation relative to axis 144 and axis 236 when in the unlocked position. As such, torque limiter device 30 enables multiple orientations of tool 12 without requiring multiple tools 12 and provides an enhanced degree of freedom of engine design regarding the positioning of fasteners used on the engine.

Figure 23:
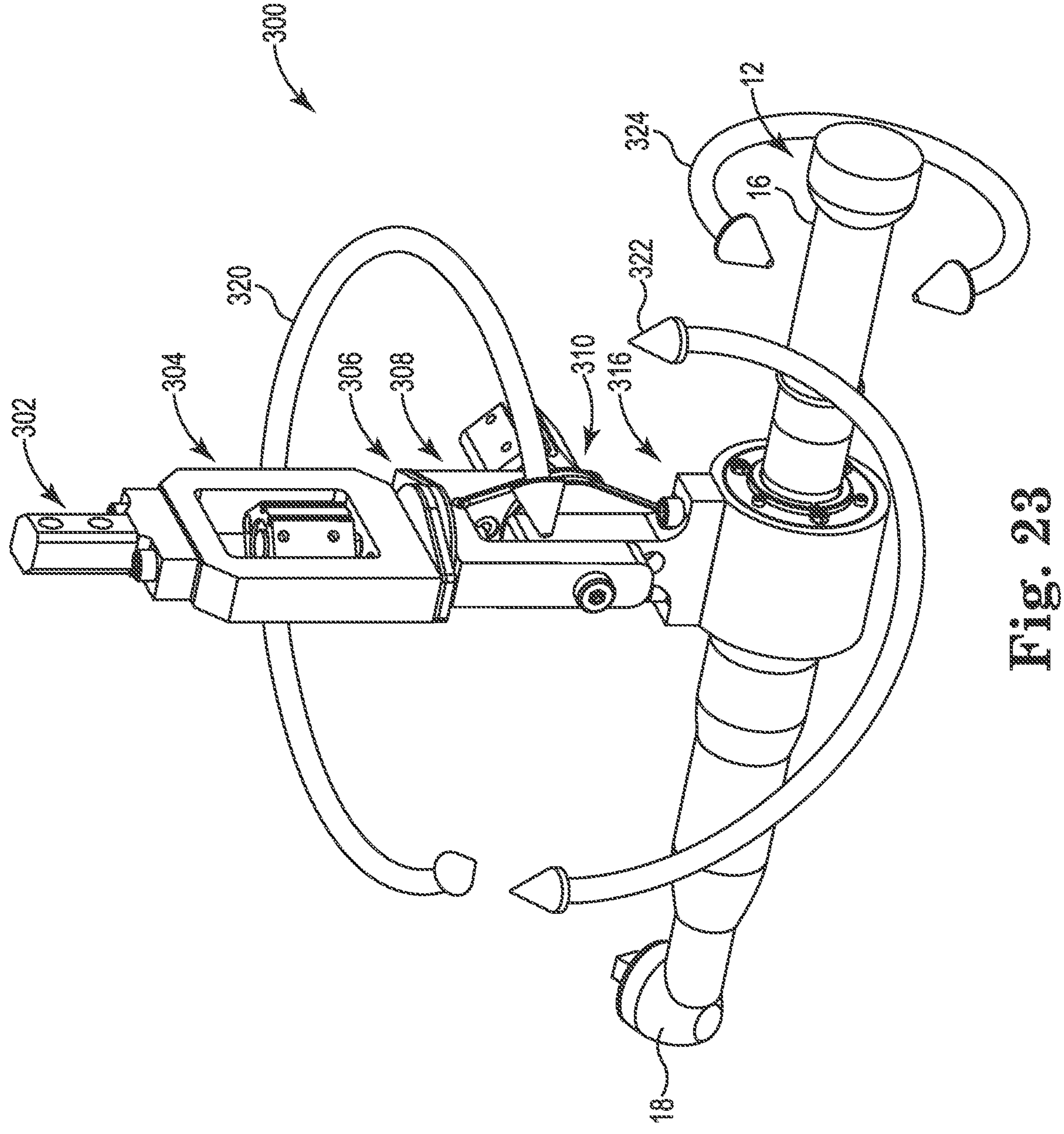
FIGS. 23 and 24 are perspective views of another embodiment of a torque transfer device according to the teachings of the present disclosure.
Figure 24:
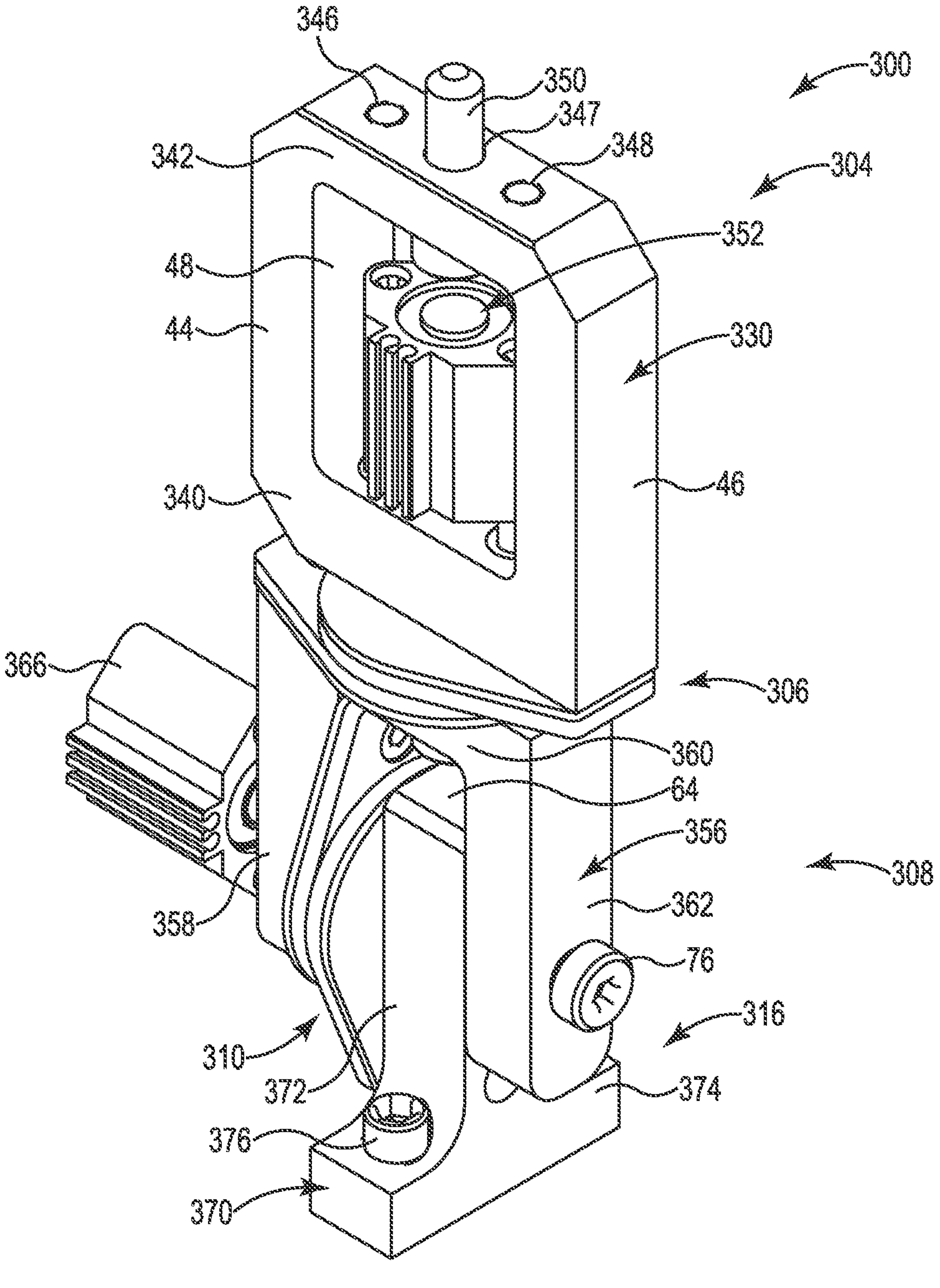
Figure 25:
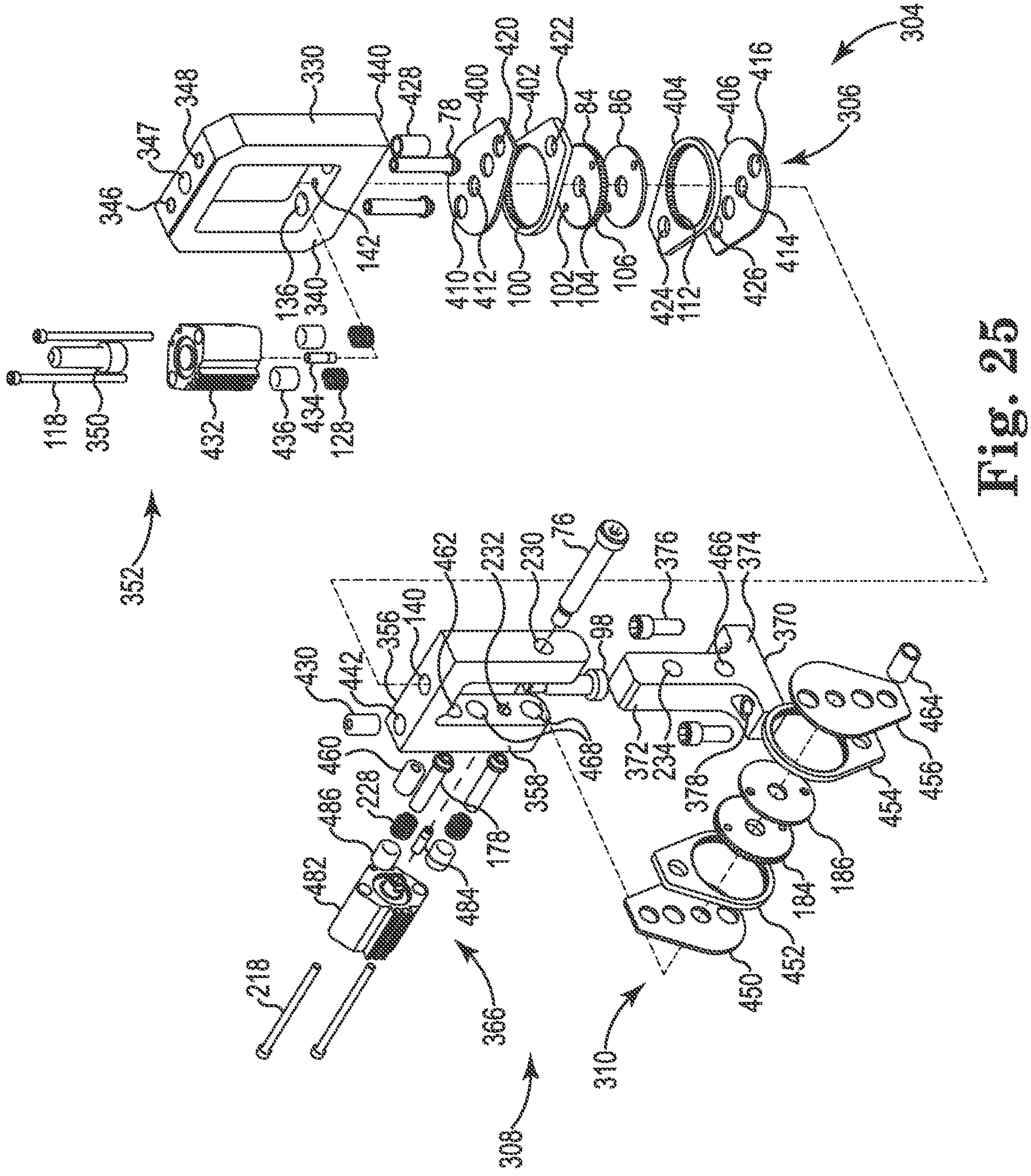
FIG. 25 is an exploded, perspective view of the torque transfer device of FIGS. 23 and 24.
Figure 26:
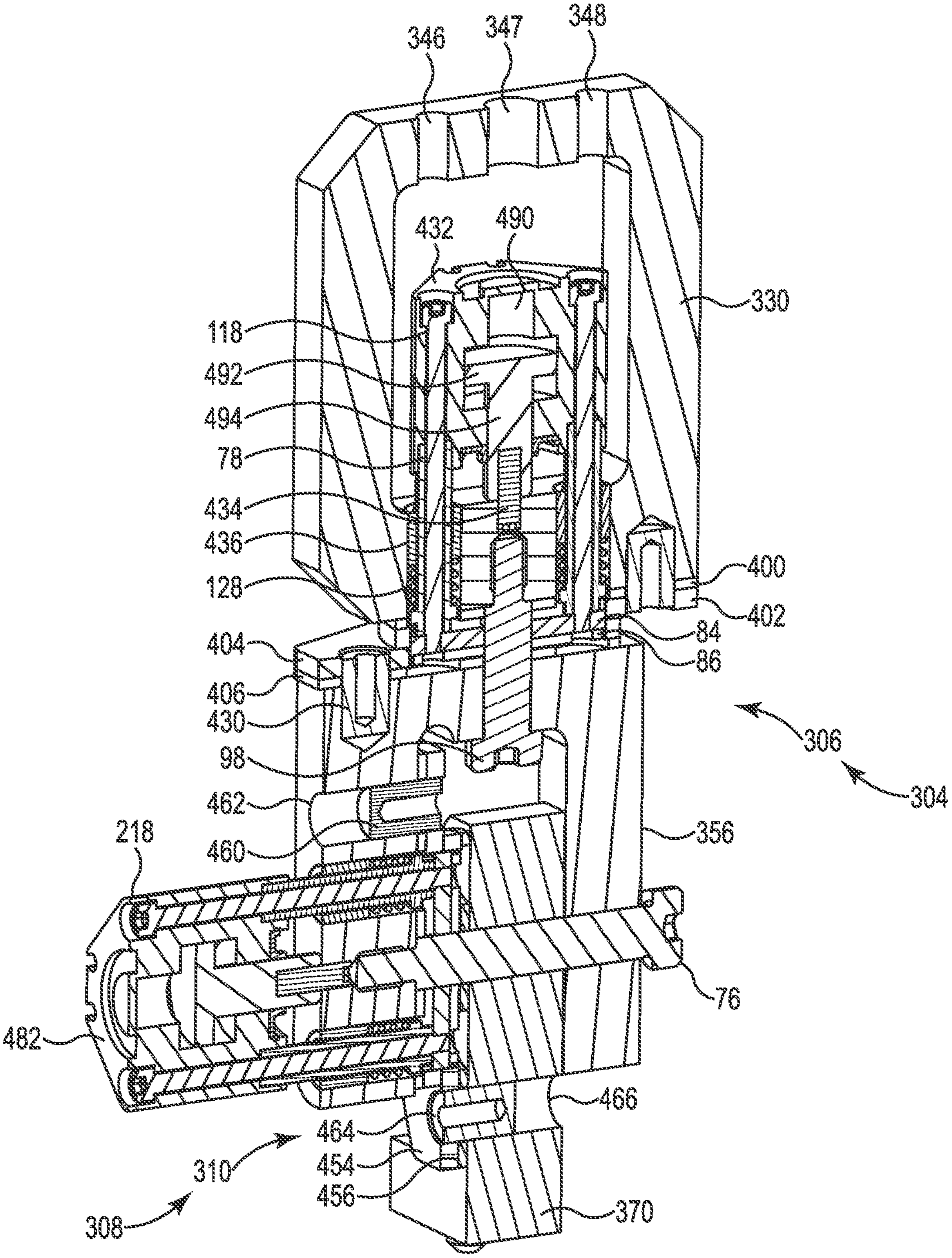
FIG. 26 is a sectional, perspective view of the torque transfer device of FIGS. 23 and 24.

FIGS. 23 and 24 are perspective views of another embodiment of a torque transfer device, denoted by numeral 300, FIG. 25 is an exploded view of torque transfer device 300, and FIG. 26 is a sectional perspective view of torque transfer device 300. Torque transfer devices 30 and 300 share some components, and those components will be designated with the same numbers designating such components with reference to FIGS. 2 to 6. Referring now to FIGS. 23 and 24, torque transfer device 300 generally includes a torque limiter connection member 302, a first joint assembly 304 (best seen in FIGS. 27 and 28) having a first joint 306, a second joint assembly 308 having a second joint 310, and a tool holder 316. Tool holder 316 supports a torque tool. First joint assembly 304 and second joint assembly 308 function in the same manner. First joint assembly 304 and second joint assembly 308 are normally locked, thereby the reaction torque of the torque tool transfers through tool holder 316, first joint assembly 304, and second joint assembly 308 to torque limiter connection member 302 and a torque limiter device connected to it. When the torque tool is deactivated, first joint assembly 304 and second joint assembly 308 become unlocked, and the torque tool can be reoriented with at least two degrees of freedom relative to the torque limiter device, illustrated by arrows 320 and 322. Tool holder 316 provides an additional degree of freedom, illustrated by arrow 324.

By contrast with torque transfer device 30, torque transfer device 300 is configured to permit use of different torque limiter connection members adapted to couple to different torque limiting devices. Torque limiter connection member 302 (shown in greater detail in FIGS. 20 and 21) illustrates one embodiment of a torque limiter connection member. Torque limiter connection member 518 (shown in FIGS. 36 and 37) illustrates another embodiment of a torque limiter connection member. A person skilled in the art understanding the present disclosure will be able to design additional configurations of torque limiter connection members to mate with different torque limiting devices.

Figure 31:
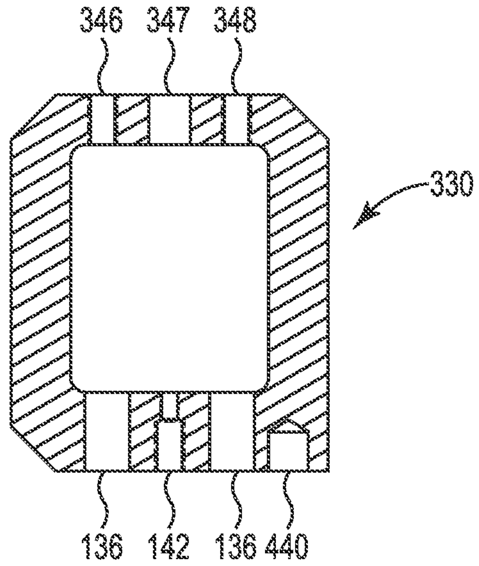

First joint assembly 304 includes first joint 306, a rod actuator 352, and a frame 330 having a lower wall 340, an upper wall 342, and side walls 44, 46 extending therebetween. A cross-sectional view of frame 330 is shown in FIG. 31. Upper wall 342 may comprise threaded apertures 346 and 348 configured to threadedly receive bolts 500 (shown in FIG. 34) to secure torque limiter connection member 302 and/or an aperture 347 configured to receive a shoulder bolt 350 to secure torque limiter connection member 518. Rod actuator 352 is positioned within central opening 48 and operable to unlock first joint 306.

Figure 32:
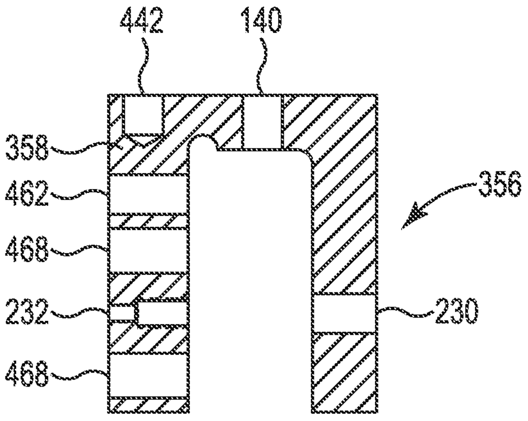

Second joint assembly 308 includes a second joint 310, a second rod actuator 366, and a frame 356 having a base 358, an upper wall 360 extending from base 358, and an end wall 362 extending from upper wall 360. A cross-sectional view of frame 356 is shown in FIG. 32. As shown, end wall 362 extends in substantially parallel relationship to base 358 and together base 358, upper wall 360, and end wall 362 form gap 64. Second rod actuator 366 is mounted to base 358 and operable to unlock second joint 310. First and second rod actuators 352, 366 may be pneumatically or electrically actuated. In the normally locked configuration, compressed air or electrical power must be available to unlock the joints. Thus, if an operator uses torque transfer device 300 and compressed air or power are suddenly lost, torque transfer device 300 will immediately lock by operation (expansion) of compressed springs 128, preventing inadvertent use of the torque tool with torque transfer device 300 unlocked, which a fail-safe configuration. By contrast, torque transfer device 30 is normally unlocked. Springs 128 of torque transfer device 30 are positioned on the upper side of lower wall 40, and upon loss of compressed air or power, springs 128 expand, causing inner gear 84 to move upwardly, thus unlocking torque transfer device 30.

Tool holder 316 generally includes a tool adapter 550 (shown in FIGS. 38 and 39) having opening 72 for receiving the torque tool and a tool connection member 370 including a projection 372 that extends from a base 374 into gap 64 and is coupled to second joint assembly 308 by shoulder bolt 76. A couple of bolts 376 secure base 374 to tool adapter 550.

Figure 29:
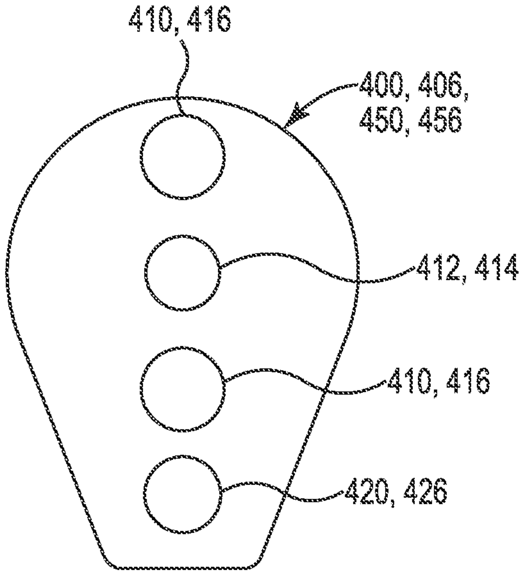
FIGS. 29 to 32 are side and cross-sectional views of components of joint assemblies of the torque transfer device of FIGS. 23 and 24.
Figure 30:
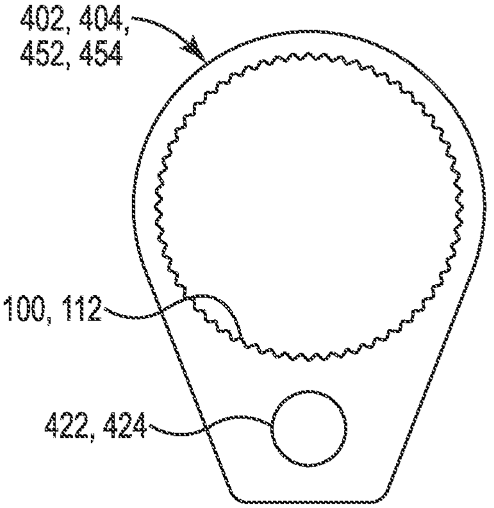

Referring to FIG. 25, an exploded view of torque transfer device 300 shows first and second joint assemblies 304 and 308 in detail. First joint 306 generally includes gear rods 78, an upper cover plate 400, an upper outer gear 402, inner gear 84, spacer 86, a lower outer gear 404, and a lower cover plate 406. Top views of upper cover plate 400 and upper outer gear 402 are shown in FIGS. 29 and 30. Upper and lower outer gears 402, 404, 452, and 454 include an inner periphery with teeth 100, 112 extending inwardly therefrom as shown in FIG. 30. Upper cover plate 400 includes a pair of openings 410 for receiving gear rods 78 and a central opening 412 for receiving shoulder bolt 98. Upper outer gear 402 includes a plurality of teeth 100 for meshing with inner gear 84. Inner gear 84 includes a pair of openings 102, a central opening 104 for receiving shoulder bolt 98, and peripheral teeth 106 for meshing with teeth 100, 112 of outer gears 402, 404. Lower outer gear 404 includes teeth 112 for meshing with inner gear teeth 106. Lower cover plate 406 includes a central opening 414 for receiving shoulder bolt 98 and a pair of openings 416 to allow interchangeability with upper cover plate 400. Upper cover plate 400 and upper outer gear 402 include openings 420, 422, respectively, for receiving a retainer 428 to secure and prevent rotation of upper cover plate 400 and upper outer gear 402 relative to frame 330. An aperture 440 is provided in frame 330 for receiving retainer 428. Lower outer gear 404 and lower cover plate 406 include openings 424, 426, respectively, for receiving a retainer 430 to secure and prevent rotation thereof relative to frame 356. An aperture 442 is provided in frame 356 for receiving retainer 430. Exemplary retainers include bushings, set screws, pins, and any other component receivable by a frame to prevent rotation of an outer gear relative to the frame.

Figures 27, 28:
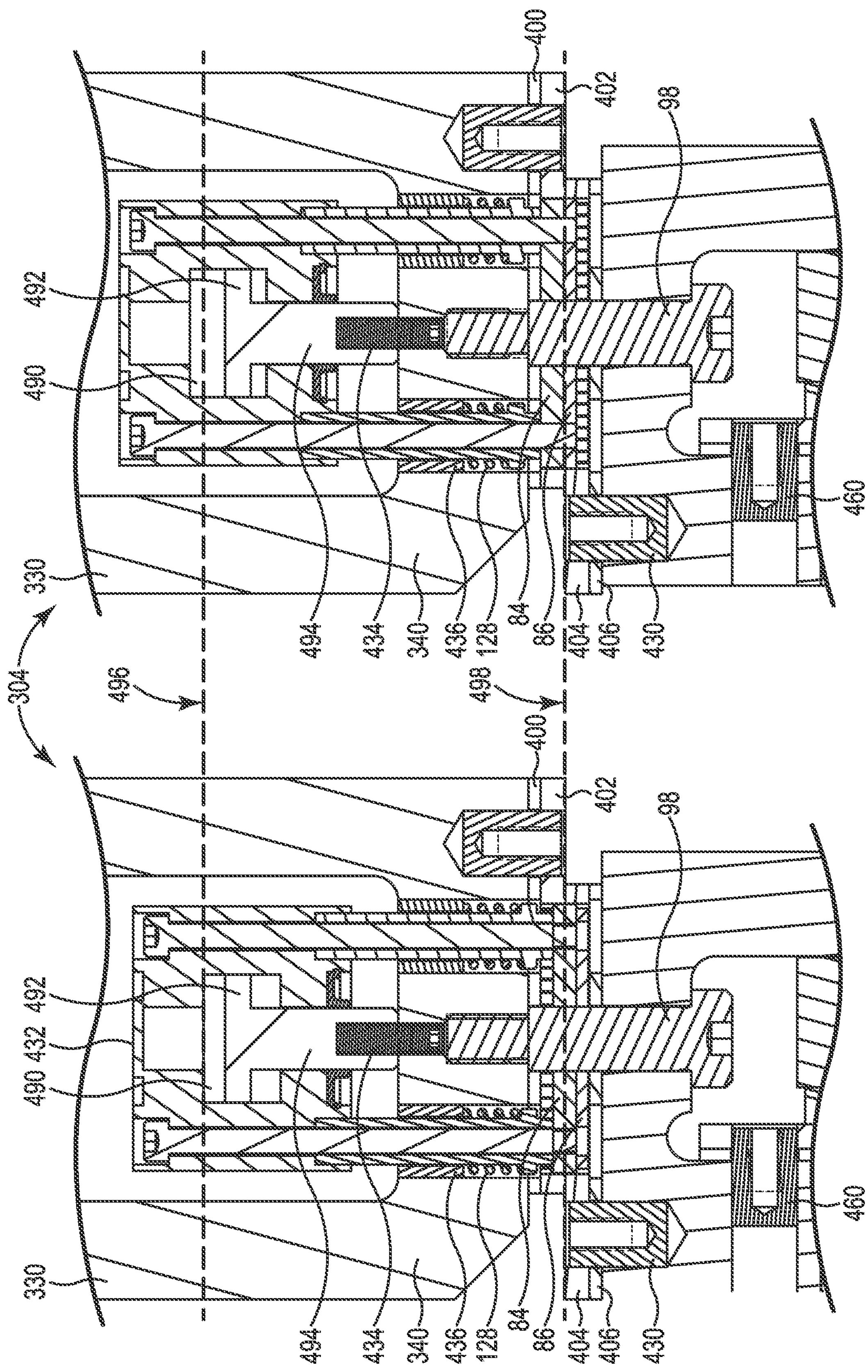
FIGS. 27 and 28 are sectional, side views of a first joint assembly of the torque transfer device of FIGS. 23 and 24 in locked and unlocked positions, respectively.

Rod actuator 352 includes housing fasteners 118 (e.g. socket head cap screws), a rod housing 432, a piston 492 and a rod 494 extending perpendicularly therefrom (best seen in FIGS. 27 and 28). Piston 492 and rod 494 are positioned within a chamber 490. A set screw 434 connects rod 494 and lower wall 340 at opening 142.

First joint 306 is normally locked. Energy is required to compress springs 128 to cause inner gear 84 to move upwardly and away from lower outer gear 404 to unlock first joint 306. Correspondingly, when energy is unavailable, first joint 306 locks by operation (expansion) of springs 128. Springs 128 are seated in apertures 136 and secured therein by bushings 436. Each bushing 436 is secured to frame 330 and provides a shoulder against which a spring 128 acts. Gear rods 78 are secured to rod housing 432 by housing fasteners 118. In the present embodiment, each gear rod 78 has a shoulder at a distal end thereof against which a spring 128 acts. Thus, each spring 128 is bounded by a bushing 436 and a shoulder of a gear rod 78. Deactivation/de-actuation of rod actuator 352, intentionally or due to loss of compressed air, for example, causes springs 128 to expand and push against the shoulders of gear rods 78, moving rod housing 432, gear rods 78, and inner gear 84 downwardly to lock first joint 306, wherein inner gear 84 is partially within upper outer gear 402 and partially within lower outer gear 404, and teeth 106 of inner gear 84 engage teeth 100 of upper outer gear 402 and teeth 112 of lower outer gear 404. This is best seen in FIG. 27, where reference lines 496 and 498 are provided to highlight the relative position of rod housing 432. Reference line 498 passes between upper outer gear 402 and lower outer gear 404. Reference line 496 represents the distance, in FIG. 27, between reference line 498 and the uppermost surface of chamber 490.

Activation/actuation of rod actuator 352 moves rod housing 432, gear rods 78, and inner gear 84 upwardly compressing springs 128 and unlocking first joint 306. Compressed air or electrical power cause piston 492 to extend causing rod housing 432 and inner gear 84 to move upwardly, as seen in FIG. 28, wherein inner gear 84 is no longer partially within lower outer gear 404. The gap between reference line 496 and the uppermost surface of chamber 490 represents the movement of rod housing 432 to unlock first joint 306.

Figure 33:
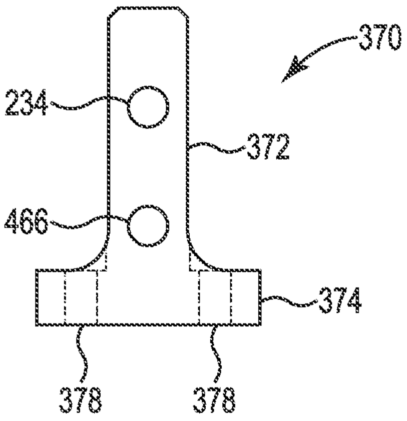
FIG. 33 is a side view of an embodiment of a tool connection member of the torque transfer device of FIGS. 23 and 24.

Second joint assembly 308 operates in the same manner as first joint assembly 304. Second joint 310 generally includes gear rods 178, an upper cover plate 450, an upper outer gear 452, inner gear 184, spacer 186, a lower outer gear 454, and a lower cover plate 456. Upper cover plate 450 is identical to upper cover plate 400. Upper outer gear 452 is identical to upper outer gear 402. Lower outer gear 454 is identical to lower outer gear 404. Lower cover plate 456 is identical to lower cover plate 406. Second joint 310 also includes a retainer 460 received by an opening 462 in frame 356 and configured to mate with apertures in upper cover plate 450 and upper outer gear 452 to secure and prevent rotation thereof relative to frame 356. Second joint 310 also includes a retainer 464 received by an opening 466 in tool connection member 370 and configured to mate with apertures in lower outer gear 454 and lower cover plate 456 to secure and prevent rotation thereof relative to tool connection member 370. A side view of tool connection member 370 is shown in FIG. 33.

Rod actuator 366 includes housing fasteners 218 (e.g. socket head cap screws), a rod housing 482, a piston and a rod extending perpendicularly therefrom, positioned within a chamber (not shown). A set screw 484 connects the rod to base 358 at opening 232.

Second joint 310 is normally locked. Energy is required to compress springs 228 to cause inner gear 184 to move away from lower outer gear 454 to unlock second joint 310. Correspondingly, when energy is unavailable, second joint 310 locks. Springs 228 are seated in apertures 468 and secured therein by bushings 486. Each bushing 486 is secured to base 358 and provides a shoulder against which a spring 228 acts. Gear rods 178 are secured to rod housing 482 by housing fasteners 218. In the present embodiment, each gear rod 178 has a shoulder at a distal end thereof against which a spring 228 acts. Thus, each spring 228 is bounded by a bushing 486 and a shoulder of a gear rod 178. Deactivation/de-actuation of rod actuator 366, intentionally or due to loss of compressed air, for example, causes springs 228 to expand and push against the shoulders of gear rods 178, moving rod housing 482, gear rods 178, and inner gear 184 toward lower outer gear 454 to lock second joint 310, wherein inner gear 184 is partially within upper outer gear 452 and partially within lower outer gear 454. Activation/actuation of rod actuator 366 moves rod housing 482, gear rods 178, and inner gear 184 in the opposite direction, compressing springs 228 and unlocking second joint 310, wherein inner gear 184 is no longer partially within lower outer gear 454.

Rod actuators 52, 66, 352 and 366 may comprise solenoids which cause the rod to extend or retract upon application of electrical power or, as discussed above, may comprise pneumatic actuators which cause the rod to extend or retract upon application of pneumatic pressure. In both cases a control signal from a controller, processing device or other control device may cause the provision of electrical or pneumatic power to the rod actuator to unlock the joint in the normally locked configuration. In an alternate embodiment, a control signal from a controller, processing device or other control device may cause the provision of electrical or pneumatic power to the rod actuator to lock the joint in the normally unlocked configuration.

An electric torque tool is connected to a control box including a controller, where desired torque levels and torque sequences may be programmed, as is known in the art. The control box may be configured to output a signal, e.g. a 24 volt signal. The signal may be provided to a pneumatic valve connected to the rod actuators. When the torque tool is activated, the signal either energizes or de-energizes the pneumatic valve, as desired, to correspondingly pressurize a chamber of the rod actuator and lock the joint (in a normally unlocked joint) or depressurize the chamber and lock the joint (in a normally locked joint). A pneumatic torque tool may be coupled to a pressure sensor configured to detect the engagement and disengagement of the torque tool. A controller, processing device, or other control device may then receive a signal from the pressure sensor and output a signal as described previously to lock or unlock the joint. If the rod actuator is actuated by a solenoid, the output signal from the control box or control device is provided to the solenoid of the rod actuator instead of the pneumatic valve to achieve the same results.

Referring now to FIG. 33, tool connection member 370 comprises projection 372 that extends from base 374. Projection 372 includes an orifice or opening 234 for receiving shoulder bolt 76, and an orifice or opening 466 for receiving retainer 464 and thereby prevent rotation of lower outer gear 454 and lower cover plate 456 relative to tool connection member 370. Base 374 includes a couple of orifices or openings 378 for receiving shoulder bolts 376 to secure base 374 to tool adapter 550 of tool holder 316.

Figure 34:
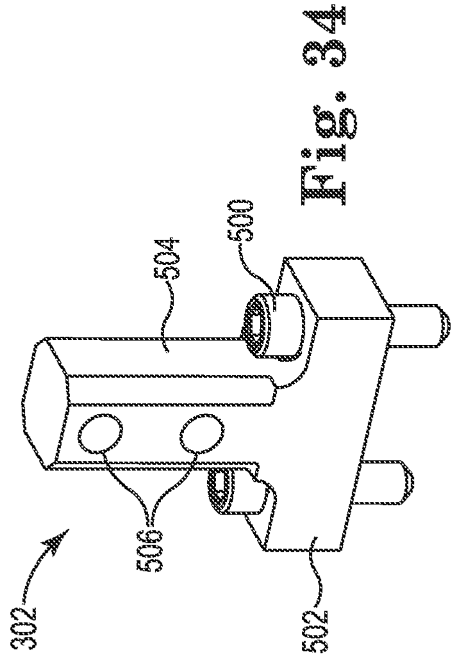
FIGS. 34 to 37 are perspective views of embodiments of torque limiter connection members of the torque transfer device of FIGS. 23 and 24.
Figure 35:
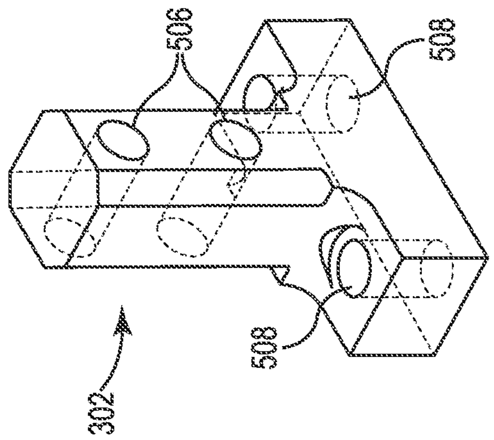

FIGS. 34 and 35 are perspective views of torque limiter connection member 302. Torque limiter connection member 302 includes a base 502 and a projection 504 extending therefrom and having a couple of orifices 506 adapted to secure torque limiter connection member 302 to a torque limiting device. Base 502 also includes a couple of orifices 508 for receiving bolts 500 therethrough to secure torque limiter connection member 302 to frame 330 when bolts 500 are secured to apertures 346, 348.

Figure 36:
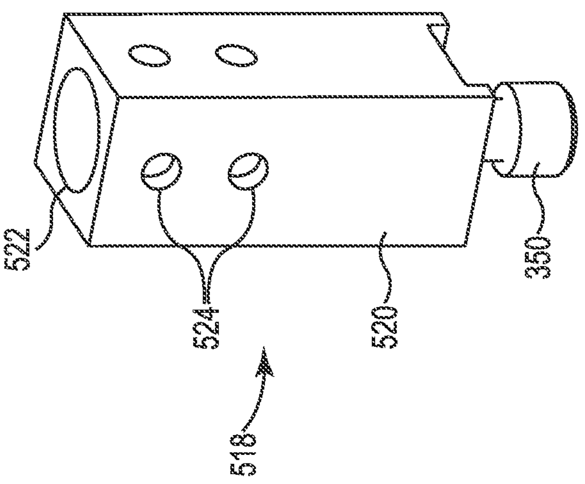
Figure 37:
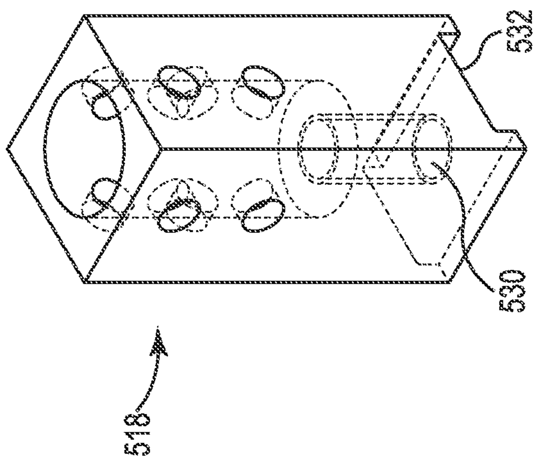

FIGS. 36 and 37 are perspective views of torque limiter connection member 518. Torque limiter connection member 518 comprises a body 520 having a central orifice 522 adapted to couple with a cylindrical projection of a torque limiting device, and further including a couple of orifices 524 adapted to secure torque limiter connection member 518 to the cylindrical projection, for example by passing pins through orifices 524 and corresponding orifices in the cylindrical projection of the torque limiting device. Body 520 further includes a lower central orifice 530 adapted to secure torque limiter connection member 518 to aperture 347 with shoulder bolt 350. A slot 532 is provided on a lower surface of body 520. Slot 532 straddles upper wall 342 and prevents rotation of torque limiter connection member 518 relative to frame 330.

Figure 38:
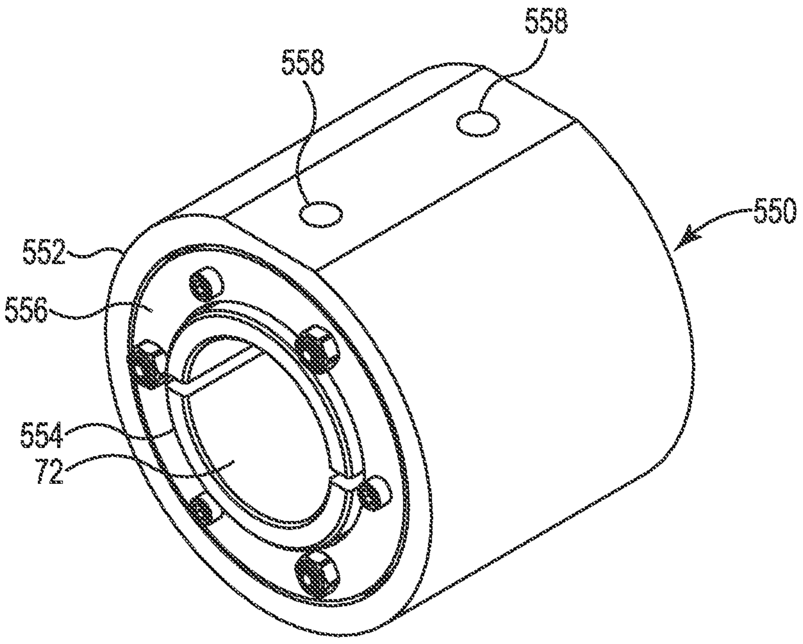
FIGS. 38 and 39 are perspective and exploded, perspective views of an embodiment of a tool adapter for use with the torque transfer device of FIGS. 23 and 24.
Figure 39:
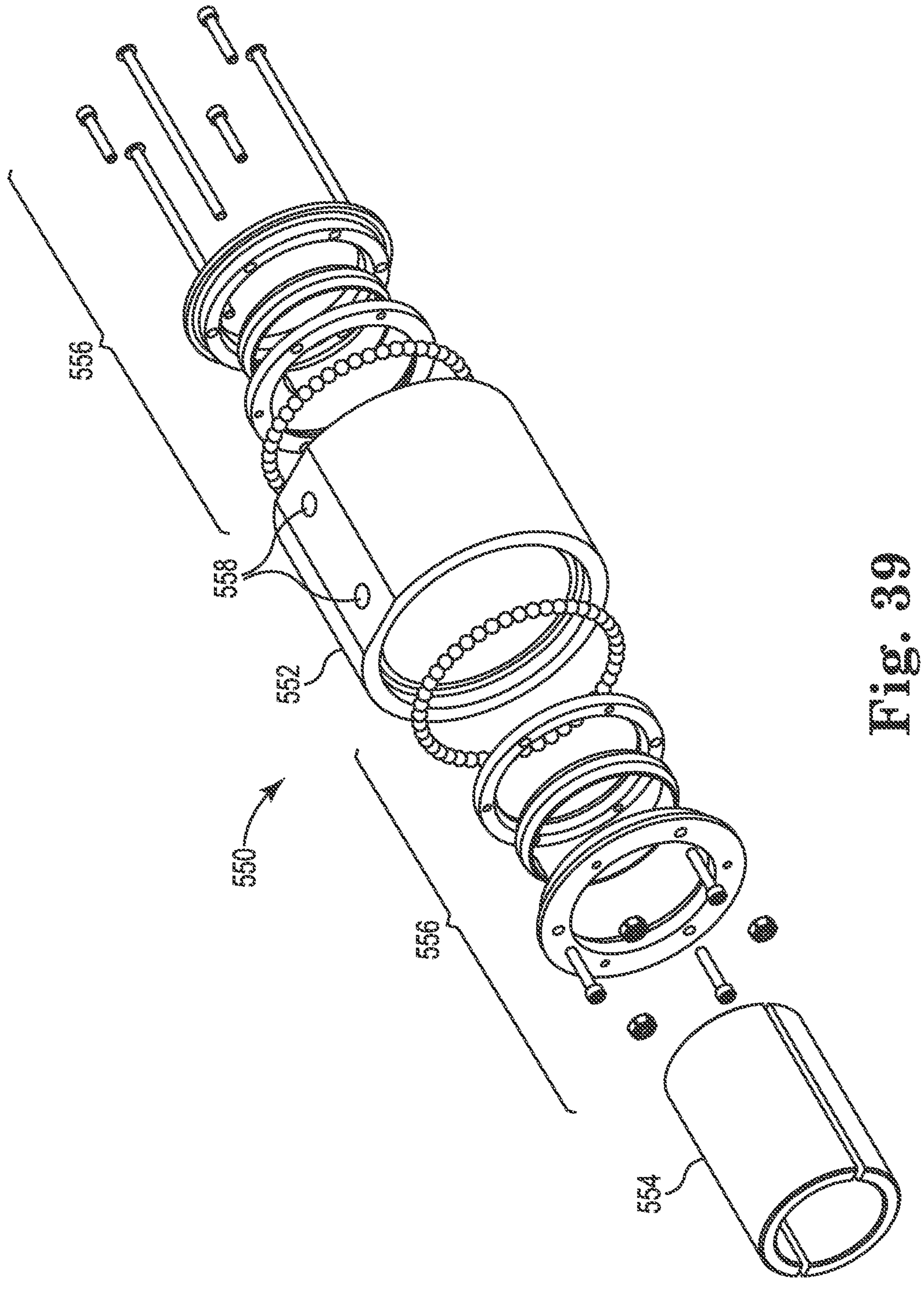

FIGS. 38 and 39 are perspective and exploded views of tool adapter 550 of tool holder 316. Tool adapter 550 comprises a cylindrical housing 552 rotatably supporting a split cylinder 554 with two bearings 556. Cylindrical housing 552 also includes a couple of threaded orifices 558 configured to receive bolts 376 to secure tool adapter 550 to base 374 of tool connection member 370.

The disclosed embodiments exemplify a torque transfer device configured to lock when the torque tool is activated and to unlock when the torque tool is deactivated, to enable a user of the torque tool to safely change the orientation of the torque tool relative to a torque limiter device with at least two degrees of freedom. Variations of connection members, rod actuators, and joint assemblies were disclosed. A person skilled in the art will understand based on the foregoing exemplary embodiments how to modify said components while still achieving the benefits and advantages disclosed hereinabove.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A torque transfer device to transfer torque from a torque tool to a torque limiter device, the torque transfer device comprising:

a torque limiter connection member adapted for connection to the torque limiter device;

a first joint;

a second joint; and a tool connection member adapted for connection to the torque tool, wherein the first joint and the second joint lock in response to activation of the torque tool to transfer a reaction torque generated by the torque tool to the torque limiter device, and wherein the first joint and the second joint unlock in response to deactivation of the torque tool to enable rotation between the torque tool and the torque limiter device along a first axis and a second axis different from the first axis.

2. The torque transfer device of claim 1, wherein the first joint includes a first gear and a first reaction gear, the first gear being movable from a first position of the first gear wherein the first gear is disengaged from the first reaction gear to a second position of the first gear wherein the first gear engages the first reaction gear to lock the first joint.

3. The torque transfer device of claim 2, further comprising a first frame and a first actuator secured to the first gear and to the first frame and configured to move the first gear relative to the first frame.

4. The torque transfer device of claim 3, wherein activation of the first actuator moves the first gear into the first reaction gear to lock the first joint.

5. The torque transfer device of claim 3, further comprising a first spring exerting tension against the first frame, wherein activation of the first actuator compresses the first spring and moves the first gear into the first reaction gear to lock the first joint.

6. The torque transfer device of claim 3, further comprising a first spring exerting tension against the first frame, wherein deactivation of the first actuator causes the first spring to move the first gear out of the first reaction gear to unlock the first joint.

7. The torque transfer device as in claim 1, wherein the first reaction gear comprises teeth projecting inwardly from an inner periphery thereof, and the first gear comprises an outer periphery with teeth projecting outwardly therefrom, and wherein when the first gear engages the first reaction gear the teeth of the first gear and the teeth of the first reaction gear mesh to lock the first joint.

8. The torque transfer device as in claim 7, wherein the first joint further comprises an upper outer gear disposed between the first frame and the first reaction gear and having an inner periphery with teeth projecting inwardly therefrom, and wherein the teeth of the first gear, the teeth of the upper outer gear, and the teeth of the first reaction gear mesh to lock the first joint.

9. The torque transfer device as in claim 8, wherein the first joint further comprises a spacer affixed to the first gear and configured to limit movement of the first gear into the first reaction gear.

10. The torque transfer device as in claim 9, wherein the spacer is removably affixed to the first gear.

11. The torque transfer device of claim 2, further comprising a second joint including a second gear and a second reaction gear, the second gear being movable from a first position of the second gear wherein the second gear is disengaged from the second reaction gear to a second position of the second gear wherein the second gear is engages the second reaction gear to lock the second joint.

12. The torque transfer device as in claim 1, further comprising a first joint assembly and a second joint assembly, the first joint assembly comprising the first joint, a first frame supporting the first joint, and a first actuator configured to lock and unlock the first joint, and the second joint assembly comprising the second joint, a second frame supporting the second joint, and a second actuator configured to lock and unlock the second joint.

13. The torque transfer device as in claim 1, further comprising a tool adapter connected to the tool connection member, the tool adapter having an opening configured to receive the torque tool.

14. The torque transfer device as in claim 13, wherein the tool adapter is removably connected to the tool connection member.

15. The torque transfer device as in claim 13, wherein the tool adapter includes a bearing adapted to rotatably connect the torque tool to the tool connection member, to enable rotation with at least three degrees of freedom between the torque tool and the torque limiter device.

16. The torque transfer device as in claim 13, wherein the torque limiter connection member is removably connected to the first frame.

17. The torque transfer device as in claim 1, wherein the first axis and the second axis are perpendicular to each other.

18. The torque transfer device as in claim 1, further comprising a controller configured to receive a torque tool activation signal and, responsive to the torque tool activation signal, to output a control signal configured to lock the first joint and the second joint.

19. The torque transfer device as in claim 1, wherein the torque limiter device comprises a stall bar.

20. A torque transfer device to transfer torque from a torque tool to a torque limiter device, the torque transfer device comprising:

a torque limiter connection member adapted for connection to the torque limiter device;

a tool connection member adapted for connection to the torque tool, first joint means for rotatably joining the torque limiter connection member to the tool connection member, wherein deactivation of the torque tool causes the first joint means to permit the torque tool to rotate about a first axis relative to the torque limiter device and activation of the torque tool causes the first joint means to prevent rotation of the torque tool about the first axis; and second joint means for rotatably joining the first joint means to the tool connection member, wherein deactivation of the torque tool causes the second joint means to permit the torque tool to rotate about a second axis relative to the torque limiter device and activation of the torque tool causes the second joint means to prevent rotation of the torque tool about the second axis.

21. A method of torqueing a securement member with a torque tool, the method comprising:

connecting a torque transfer device to the torque tool;

connecting the torque transfer device to a torque limiter device, wherein the torque transfer device comprises a first joint configured to permit the torque tool to rotate about a first axis relative to the torque limiter device, and the torque transfer device also comprises a second joint configured to permit the torque tool to rotate about a second axis relative to the torque limiter device, the second axis being different from the first axis;

activating the torque tool, whereby activation of the torque tool automatically locks the first joint and the second joint to prevent rotation of the torque tool about the first axis and the second axis; and deactivating the torque tool, whereby deactivation of the torque tool unlocks the first joint and the second joint to permit rotation of the torque tool about the first axis and the second axis.

* * * * *